(12) United States Patent
Faibish et al.

(10) Patent No.: US 8,402,226 B1
(45) Date of Patent: Mar. 19, 2013

(54) RATE PROPORTIONAL CACHE WRITE-BACK IN A STORAGE SERVER

(75) Inventors: Sorin Faibish, Newton, MA (US); John Forecast, Newton Center, MA (US); Peter Bixby, Westborough, MA (US); Philippe Armangau, Acton, MA (US); Sitaram Pawar, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 12/818,577

(22) Filed: Jun. 18, 2010

(51) Int. Cl.
G06F 13/00 (2006.01)
G06F 13/28 (2006.01)

(52) U.S. Cl. ............... 711/143; 711/112; 711/E12.021; 710/52

(58) Field of Classification Search .................. 711/143, 711/112, E12.021; 710/52
See application file for complete search history.

(56) References Cited

U.S. PATENT DOCUMENTS

| | | | |
|---|---|---|---|
| 5,893,140 A | 4/1999 | Vahalia et al. | |
| 5,933,603 A | 8/1999 | Vahalia et al. | |
| 6,865,157 B1 | 3/2005 | Scott et al. | |
| 7,062,675 B1 | 6/2006 | Kemeny et al. | |
| 7,809,975 B2 | 10/2010 | French et al. | |
| 7,849,350 B2 | 12/2010 | French et al. | |
| 7,937,531 B2 | 5/2011 | Mitra | |
| 2003/0084252 A1* | 5/2003 | Talagala | 711/135 |
| 2003/0212865 A1* | 11/2003 | Hicken et al. | 711/135 |
| 2004/0117441 A1* | 6/2004 | Liu et al. | 709/203 |
| 2007/0250660 A1* | 10/2007 | Gill et al. | 711/103 |
| 2009/0172286 A1* | 7/2009 | Lasser et al. | 711/127 |
| 2010/0199039 A1* | 8/2010 | Bauman et al. | 711/114 |
| 2010/0274962 A1* | 10/2010 | Mosek et al. | 711/113 |
| 2011/0191534 A1* | 8/2011 | Ash et al. | 711/113 |

OTHER PUBLICATIONS

Uresh Vahalia, Unix Internals: The New Frontiers, Chapter 9, "File System Implementations," and Chapter 11, ,"Advanced File Systems," 1996, p. 261-289, 338-371, Prentice-Hall, Inc., Upper Saddle River, New Jersey.

Bill Nowicki, "NFS: Network File System Protocol Specification," Network Working Group, Request for Comments: 1094, Mar. 1989, 27 pages, Sun Microsystems, Inc., Mountain View, CA.

Brian Pawlowski et al., "The NFS Version 4 Protocol," Technical Report TR3085, 2005, 30 pages, Network Appliance, Inc., Sunnyvale, CA.

Chen, P.M., "Optimizing Delay in Delayed-Write File Systems," Proceedings of the 1994 International Conference on Architectural Support for Programming Languages and Operating Systems (ASPLOS), San Jose, California, Oct. 1994, 12 pages, Association for Computing Machinery, New York, NY.

(Continued)

*Primary Examiner* — Edward Dudek, Jr.
(74) *Attorney, Agent, or Firm* — Richard Auchterlonie; Novak Druce Connolly Bove + Quigg LLP

(57) ABSTRACT

Based on a count of the number of dirty pages in a cache memory, the dirty pages are written from the cache memory to a storage array at a rate having a component proportional to the rate of change in the number of dirty pages in the cache memory. For example, a desired flush rate is computed by adding a first term to a second term. The first term is proportional to the rate of change in the number of dirty pages in the cache memory, and the second term is proportional to the number of dirty pages in the cache memory. The rate component has a smoothing effect on incoming I/O bursts and permits cache flushing to occur at a higher rate closer to the maximum storage array throughput without a significant detrimental impact on client application performance.

17 Claims, 14 Drawing Sheets

OTHER PUBLICATIONS

Ganger, G., and Yale, N. P. "Metadata Update Performance in File Systems," 1994 USENIX Symposium on Operating Systems Design and Implementation (OSDI), Monterey, CA, Nov. 14-17, 1994, pp. 49-60, USENIX, Berkeley, CA.

Ganger, G. and Kaashoek, M., "Embedded Inodes and Explicit Grouping: Exploiting Disk Bandwidth for Small Files," in Proceedings of the USENIX Winter 1997 Technical Conference, Jan. 1997, pp. 1-17, USENIX, Berkeley, CA.

Ganger, G., McKusick, M., Soules, C., and Patt, Y., "Soft Updates: A Solution to the Meta-data Update Problem in File Systems," ACM Transactions on Computer Systems, vol. 18, No. 2, pp. 127-153, May 2000, Association for Computing Machinery, New York, NY.

Ang, K. H., et al., "PID Control System Analysis, Design, and Technology," IEEE Transactions on Control Systems Technology, vol. 13, No. 4, Jul. 2005, pp. 559-576, IEEE, New York, NY.

Nesic, D., et al., "Output Dead Beat Control for a Class of Planar Polynomial Systems," SIAM J. of Control Optim. vol. 36, No. 1, Jan. 1998, pp. 253-272, Society for Industrial and Applied Mathematics. Philadelphia, PA.

Moore, K.L., and Naidu, D.S., "Linear Quadratic Regulation Using Neural Networks," International Joint Neural Networks Conference (IJNNC), Seattle, Washington, Jul. 8-12, 1991, pp. 735-739, IEEE, New York, NY.

Moore, K.L., et al., "A real-time adaptive linear quadratic regulator using neural networks," European Control Conference (ECC), Groningen, The Netherlands, Jun. 28-Jul. 1, 1993, 5 pages, European Union Control Association, Cachan Cedex France.

Thereska, E. et al., "A framework for building unobtrusive disk maintenance applications," Proceedings of the FAST'04 Conference, San Francisco, CA. Mar. 2004, 25 pages, USENIX, Berkeley, CA.

Mogul, J., "A Better Update Policy." Proceedings of the Summer 1994 USENIX Conference, Jun. 1994, pp. 99-111, USENIX, Berkeley, CA.

Carson, Scott D., and Setia, Sanjeev, "Analysis of the Periodic Update Write Policy for Disk Cache," IEEE Transactions on Software Engineering, vol. 18, No. 1, Jan. 1992, pp. 44-54, IEEE, New York, NY.

Ganger. G. R., and Patt, Y.N., "Using System-Level Models to Evaluate I/O Subsystem Designs," IEEE Transactions on Computers, vol. 47, No. 6, Jun. 1998, pp. 667-678, IEEE, New York, NY.

\* cited by examiner

RATE PROPORTIONAL CACHE WRITE-BACK IN A STORAGE SERVER

FIELD OF THE INVENTION

The present invention relates generally to a storage system having a buffer cache and a storage array. The present invention relates specifically to a cache write-back method for the storage system.

BACKGROUND OF THE INVENTION

A storage system typically includes a programmed data processor, a storage array, and a buffer cache. Most buffer caches are write-back in nature for asynchronous or fast write operations. In response to an asynchronous write request, pages of data are written to the cache, the pages in the cache are marked dirty, an acknowledgement of the write operation is returned to the originator of the write request, and some time later the pages are written to the storage array and the pages in the buffer cache are marked clean. In this fashion, the cache hides high disk latencies and avoids performance loss from disk seeks during random access.

Typically a write-back task in a cache manager program ensures that no dirty page remains in the cache for more than a certain length of time. Typically the write-back task also is designed to provide that the cache will have more than a certain minimum number of free memory pages for servicing fast write requests unless the storage system is overloaded. Typically the maximum persistence time of a dirty page in the cache is thirty seconds, and the minimum number of free pages is based on the memory capacity of the cache and is a small fraction of the memory capacity of the cache.

For example, traditional UNIX® file system managers used a periodic update policy, writing back all delayed-write data once every 30 seconds. Such a method of periodic update is easy to implement but degrades synchronous read-write response times at these periodic intervals. Some cache managers also have used high and low watermarks to address space exhaustion. If the number of dirty pages in the cache hits an upper threshold, called the high water mark, then the cache manager wrote back to the storage array as many dirty pages as needed until the number of dirty pages in the cache hit a lower threshold, called the low water mark. The dirty pages were kept on a least recently used (LRU) list so that the least recently used dirty pages were written back before the most recently used dirty pages.

Early NFS clients used relatively small local caches and frequently initiated the flush of dirty pages to the disk using commit operations sent to the storage system. The early storage systems also had relatively small caches, so that the commit operations usually occurred at a rate greater than once every three seconds. Under these conditions, the periodic update policy provided acceptable performance because a relatively small fraction of the write-back operations were performed during the periodic update. Nevertheless, it was recognized that the use of synchronous writes or commit operations limited the performance of application I/O.

Modern NFS clients, with larger local caches, improved their performance by sending multiple I/Os in parallel to the storage system, using delayed writes, without sending any commit operations and counting on the server to flush data to disk at its own leisure. In this case the server flushed the dirty pages based on its cache occupancy state, disconnected from the application intent. It was recognized that under these conditions, the periodic update policy would interfere with application I/O during periodic flushes. It was also recognized that watermark based policies would also interfere with application I/O while the number of dirty pages was being reduced from the high watermark to the low watermark. Therefore designers of data storage systems have been investigating alternative write-back cache update policies that would improve write-back performance and reduce interference with application I/O.

Some proposed update policies trickle periodical flush operation of a small number of pages as a background task with lowest priority to keep the number of dirty pages to a lower level and prevent the cache from filling up too fast. Other similar policies schedule the user data flushes as asynchronous disk writes as soon as a modification fills an entire page. At the other end of the spectrum, some proposed policies modify the watermark technique by flushing dirty pages based on retention time. Other similar policies attempt to update the retention time based on disk performance characteristics, for example by reducing the retention time to match the ratio between the buffer cache size and the disk transfer rate. Others replace the time-driven update policies with dynamic policies, which choose when to schedule disk writes based on the system load and the disk queue length.

More recently, the combination of periodic update and watermark based writeback policies used in the vast majority of storage systems has not been keeping up with the higher speeds of application incoming writes, resulting in a significant performance penalty. With larger caches and dramatic increases in the storage system workloads, the performance penalty has become more detrimental to file system and user application performance. Therefore there is renewed interest in alternative write-back cache update policies that do not require extensive changes to existing cache management programs yet would improve writeback performance and reduce interference with file system and user application performance.

SUMMARY OF THE INVENTION

The present invention recognizes that in a storage system, it is desirable to flush dirty pages from a cache memory to a storage array at a rate proportional to the rate at which the dirty pages are generated by incoming I/O requests. Existing cache managers, however, do not measure the rate at which dirty pages are generated by incoming I/O requests. Moreover, the rate at which dirty pages are generated by incoming I/O requests is dependent upon a number of factors, such at the rate of incoming I/O requests that are write requests, the size of each I/O write request, alignment of each I/O write request with the pages in the cache, and whether each write request is accessing a clean or dirty page. Sometimes a full page is cached if any part of it is accessed by a write request, and sometimes a dirty page is accessed by multiple write requests before the dirty page is flushed from cache memory to the storage array.

The present invention recognizes that the number of dirty pages in the cache is maintained by existing cache managers, and the number of dirty pages in the cache can be used to control the rate of flushing of dirty pages from the cache memory to disk storage to obtain good cache writeback performance comparable to measuring the rate at which incoming I/O requests generate dirty pages and flushing the dirty pages from the cache at a rate proportional to the rate at which the dirty pages are generated by incoming I/O requests. Comparable writeback performance can be obtained because the rate at which pages become dirty in the cache memory is equal to the rate of change in the number of dirty pages in the cache memory minus the rate at which dirty pages are flushed from the cache. Therefore adjustment of the rate of flushing of dirty pages from the cache memory to the storage array based on the rate of change in the number of dirty pages in the cache memory is a kind of feedback control of the rate of flushing in response to the rate of creation of the dirty pages in the cache by incoming I/O requests. Feedback control system theory can be applied to the properties of the cache and storage array and the characteristics of the incoming I/O requests to obtain a feedback control function that is most responsive to the incoming I/O requests for good writeback performance and minimal interference with processing of the incoming I/O requests.

In accordance with one aspect, the invention provides a computer-implemented method of cache writeback in a data storage system. The data storage system includes a cache memory, a storage array, and a data processor coupled to the cache memory and coupled to the storage array for modifying pages of data in the cache memory so that a number of the pages in the cache memory become dirty, and writing the dirty pages from the cache memory to the storage array so that the dirty pages become clean. The method includes the data processor executing computer instructions stored on a non-transitory computer-readable storage medium to perform the steps of obtaining a count of the number of dirty pages in the cache memory, and based on the count of the number of dirty pages in the cache memory, writing the dirty pages from the cache memory to the storage array at a rate having a component proportional to a rate of change in the number of dirty pages in the cache memory.

In accordance with another aspect, the invention provides a data storage system including a cache memory, a storage array, a data processor, and a non-transitory computer readable storage medium. The data processor is coupled to the cache memory and coupled to the storage array for modifying pages in the cache memory so that a number of the pages in the cache memory become dirty, and writing the dirty pages from the cache memory to the storage array so that the dirty pages become clean. The non-transitory computer readable storage medium stores computer instructions that, when executed by the data processor, perform the steps of obtaining a count of the number of dirty pages in the cache memory, and based on the count of the number of dirty pages in the cache memory, writing the dirty pages from the cache memory to the storage array at a rate having a component proportional to a rate of change in the number of dirty pages in the cache memory.

In accordance with a final aspect, the invention provides a non-transitory computer readable storage medium. The non-transitory computer readable storage medium stores computer instructions that, when executed by a data processor, perform writeback to a storage array of a number of dirty pages in a cache memory by the steps of obtaining a count of the number of dirty pages in the cache memory, and based on the count of the number of dirty pages in the cache memory, writing the dirty pages from the cache memory to the storage array at a rate having a component proportional to a rate of change in the number of dirty pages in the cache memory.

BRIEF DESCRIPTION OF THE DRAWINGS

Additional features and advantages of the invention will be described below with reference to the drawings, in which.

Figure 1:
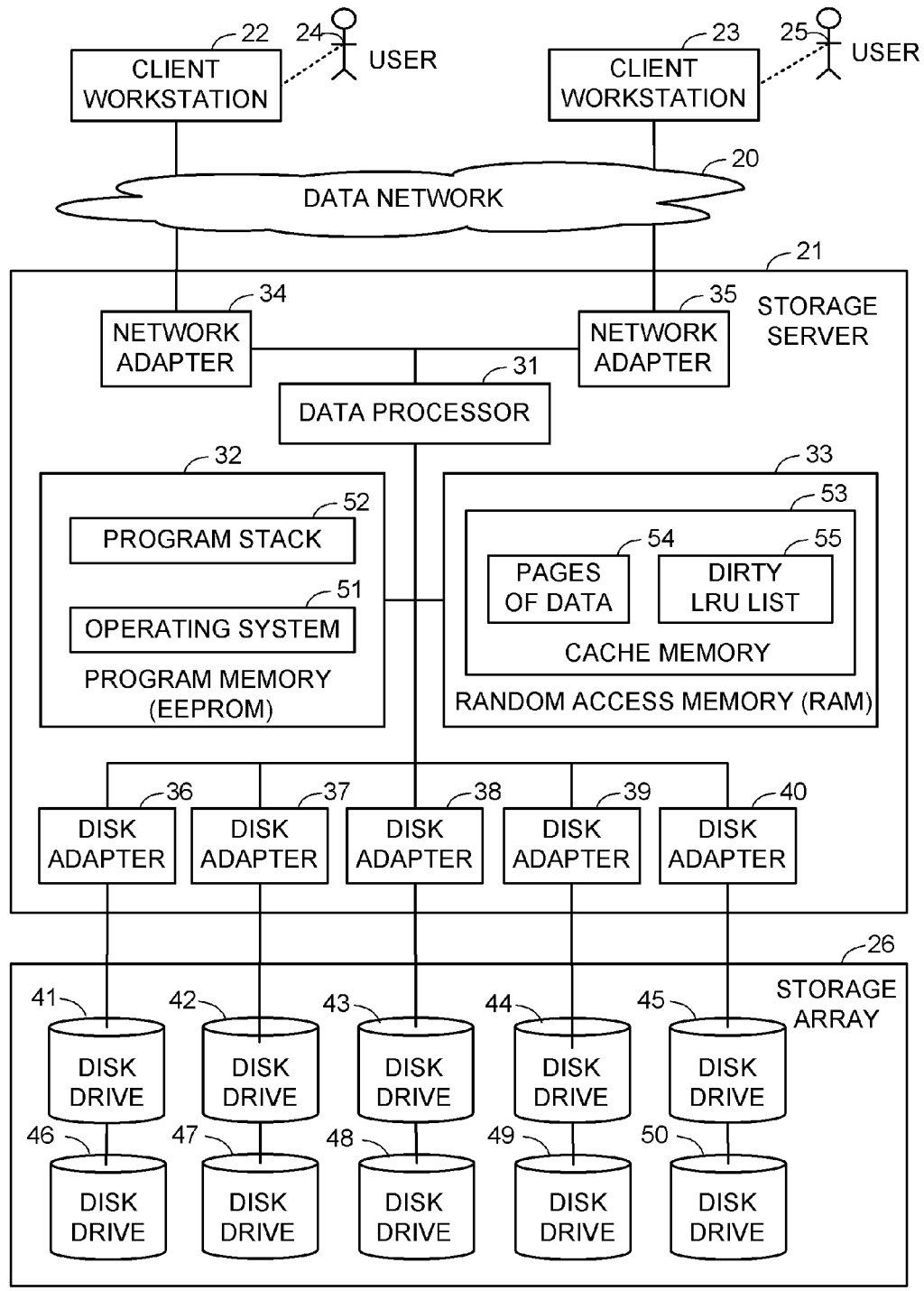
FIG. 1 is block diagram of a data network including a data storage system.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including a data network 20 linking a storage server 21 to client workstations 22, 23 operated by human users 24 and 25. The data network 20, for example, is an Ethernet or Internet Protocol (IP) data network. The storage server 21 provides client access to a storage array 26, such as a redundant array of disk drives 41 to 50. The storage server 21 may have various names depending on additional services that it provides to the clients 22, 23. For example, if the storage server 21 provides a minimal level of functionality, such as translation of logical storage addresses in client requests to physical storage addresses in the storage array 26, then the storage server is called a storage array controller. If the storage server 26 provides client access to shared file systems stored in the storage array 26, then the storage server 26 is called a file server.

The storage server 21 includes a data processor 31, program memory 32, random access memory 33, network adapters 34, 35 for linking the data processor 31 to the data network 20, and disk adapters 36, 37, 38, 39, and 40 for linking the data processor 31 to respective strings of the disk drives 41 to 50 in the storage array. The data processor 31 is a general purpose digital computer data processor including one or more core central processing units (CPUs) for executing computer program instructions stored in the program memory 32.

The program memory 32 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks. The program memory 32 stores an operating system program 51 and a program stack 52 executed under control of the operating system program 51.

The random access memory 33 includes a cache memory 53 storing pages of data 54. A page of data in the cache is a unit of granularity of data that is read from the storage array, written into the cache memory, modified in the cache memory in response to a write request from a client so that the page of data becomes dirty in the cache memory, and later written from the cache memory back to the storage array so that the dirty page become clean. For example, each of the disk drives 41 to 50 perform an atomic write operation upon a block of data known as a disk block or sector, the cache memory is configured to have a fixed page size, and the fixed page size includes a whole number of one or more disk blocks. In a file server, for example, the page size is the same size as a file system block, the file system block size is four kilobytes, each file system block includes eight disk blocks, and each disk block includes 512 bytes.

Typically the storage server 21 is configured to respond to an asynchronous or fast write request from a client by writing new data to a page of data in the cache memory, and then immediately returning an acknowledgement of the write request to the client, before the new data is written back to the storage array 26. Under normal circumstances it is desired to write each dirty page of data from the cache memory 53 back to the storage array within a certain time after the dirty page becomes dirty. A typically way of ensuring such a maximum persistence time of a dirty page in the cache is to place each dirty page onto the tail of a dirty LRU list 55 kept in the cache memory 53. A background writeback task services the dirty LRU list by writing the dirty page at the head of the dirty LRU list from the cache memory 53 back to the storage array 26, and then removing the dirty page from the head of the dirty LRU list.

Figure 2:
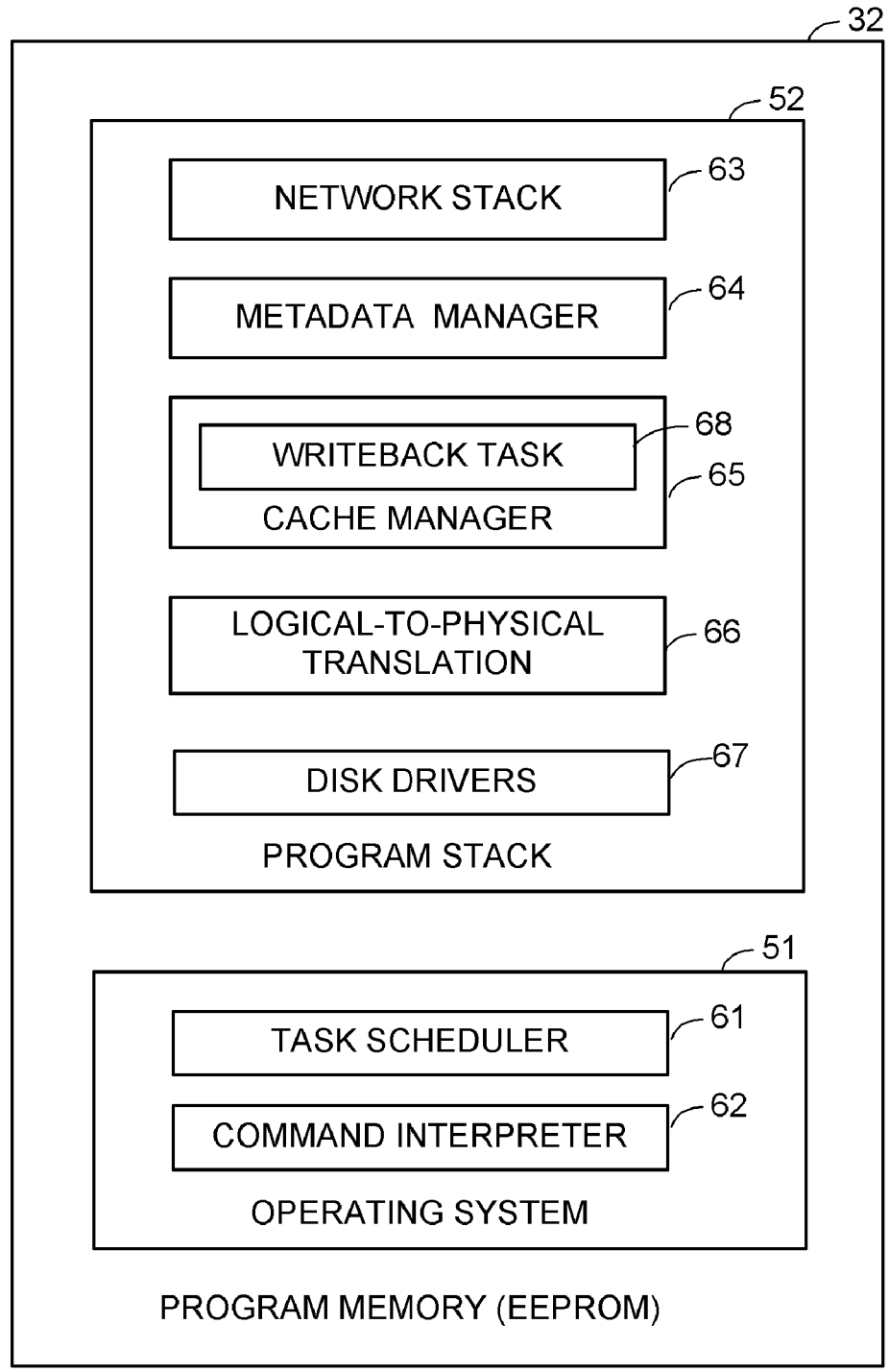
FIG. 2 is a block diagram of computer programs in the data storage system of FIG. 1.

FIG. 2 shows the computer programs in the program memory 32. The operating system 51 includes a real-time task scheduler 61 and a command interpreter 62. The task scheduler 61 may schedule real-time (RT) tasks and also general purpose (GP) tasks programmed as code threads. The task scheduler 61, for example, maintains application timers, and schedules execution and context switching between real-time (RT) and general purpose (GP) code threads. A suitable task scheduler is shown and described in FIG. 7 and columns 11 to 13 of Vahalia et al. U.S. Pat. No. 5,933,603 issued Aug. 3, 1999, incorporated herein by reference.

The command interpreter 62 is responsive to configuration and control commands from a systems administrator. For example, the systems administrator may set up access controls limiting the clients that have access to the storage array, and may also partition the storage array into logical volumes or logical units of storage (LUN) accessible to particular clients.

The program stack 52 includes a network stack 63, a metadata manager 64, a cache manager 65, a logical-to-physical translation module 66, and disk drivers 66. The network stack 63 implements network protocols such as TCP/IP for communication with the clients (22, 23 in FIG. 1) over the data network (20 in FIG. 1). The metadata manager 64 manages metadata of storage objects such as volumes, logical units of storage (LUNs), and files or file systems. The metadata typically includes mapping information for mapping the storage objects to logical storage addresses, and attributes of the storage objects such as alphanumeric names, access times, and access control lists.

The cache manager 65 is responsible for maintaining cache state information such as a list of free pages of the cache memory, a hash index for determining whether data at a specified logical storage address is found in a page of data in the cache and if so the cache memory address of the page, and a least recently used list of all used pages of the cache memory. The cache manager 65 includes a writeback task 68 responsible for maintaining the dirty LRU list while writing dirty cache pages from the cache memory to the storage array.

The logical-to-physical translation module 66 maps logical addresses used by the cache manager to physical addresses of storage blocks such as disk sectors in the storage array (26 in FIG. 1). The logical-to-physical translation module 66 is configured for certain patterns of data striping across the storage devices in the storage array. For example, the storage array is configured as a redundant array of disk drives (41 to 45 in FIG. 1) so that the logical-to-physical translation module 66 may recover from single disk drive failures using parity techniques.

The disk drivers 67 provide an interface between the logical-to-physical translation module 66 and the disk adapters (36-40.)

The present invention more particularly concerns programming the writeback task so that the number of dirty pages in the cache controls the rate of flushing of dirty pages from the cache memory to disk storage in such a way as to obtain good cache writeback performance and minimal interference with client I/O write operations. A primary goal is to minimize the number of dirty pages in the cache while preventing stoppage of incoming client I/O request streams and maintaining smooth utilization of disk I/O throughputs to maximize application performance. A secondary goal is to increase the scalability of storage arrays by preventing bursty I/O operations.

As introduced above, most storage array caches have used a watermark type of flushing procedure because it is very simple and easy to implement, but the watermark type of flushing procedure has frustrated disk throughput, which is measured in bytes per unit of time. For file servers, so long as the ratio between metadata pages and client data dirty pages was similar, the watermark type of flushing procedure was good enough to ensure smooth disk I/O access. Since the total amount of cached user data has become much higher in the new storage arrays, the watermark type of flushing procedure has become a performance bottleneck for the client applications. There is a disconnect between the large number of dirty pages cached in very large buffer caches and the time required to flush them to disk. The flush time is critical to the client application performance because flushing triggered by a high watermark causes stoppage of client application I/Os. The I/O throughput of the disk is limited and as long as the amount of data to be flushed is small, corresponding to small caches, the stoppage time is acceptable to applications that have a certain tolerance to stoppage before failure. Because the cache size has continued to increase much faster than the disk throughput, the stoppage time during watermark flushing has been increasing and is becoming unacceptable to applications and may result in frequent failures.

The problem of flushing client data dirty pages depends on the maximum I/O throughput of the storage array, and the maximum throughput of the storage array will limit application I/O performance. But the required behavior of the storage server is defined and provisioned to ensure that the client application performance will not be bounded before the maximum provisioned throughput is reached. This requirement translates into minimal or no application I/O stoppage even in the case of a large change in the incoming application I/O throughput to storage until the maximum storage array throughput is reached. The problem is complicated by the fact that the watermark methods wait for a trigger before starting the flush to disk. They have no ability to predict and compensate priori for rapid changes in the incoming I/O rate as they are insensitive to the change in the number of dirty pages in the buffer cache. In general there is no correlation between the maximum disk speeds and the rate of change in the application I/O speeds.

As a result of the above analysis it is clear that flushing using watermark techniques is incapable of ensuring steady application performance as compared to say I/O rate based cache writeback techniques. Thus, in light of the fact that disk performance is measured in throughput and not in the amount of bytes written, it is desired to flush proportional to the I/O throughput. By controlling the disk throughput the effect of big changes in the incoming I/O stream will be mitigated to prevent I/O stoppage to the application. Of course a storm of I/Os in a very short period of time will be exposed to possible I/O stoppages, but for a limited period of time application failure is prevented.

It is desired to address the problem by using I/O rate proportional procedures with the goal of reducing I/O stoppage to an acceptable level for the majority of applications, including those that do not send any I/O commits to the storage server. This can be done by using the rate of change of the number of user data dirty pages in the buffer cache as an indication of the I/O rate because there is no convenient way of directly measuring the number of dirty pages generated by an application until the I/O write requests become dirty pages in the cache memory. Direct measurement of the number of dirty pages generated by an application is especially difficult because the size of the application I/Os are different from the cache page size and sometimes full pages are cached even if only part of them were written by the application, and some parts of a dirty page may be re-written multiple times in the cache before the dirty page is written to disk.

Assuming that most all of the dirty pages in cache are generated by client application I/Os, the rate of change in the number of dirty pages in the buffer cache is a good indication of the rate at which the client application I/Os generate dirty pages in the buffer cache because the difference between the two is essentially the rate at which dirty pages are flushed from the cache memory to the storage array. In the absence of an overload condition, the rate at which dirty pages are flushed from the cache memory to the storage array can be estimated based on current conditions, such as the number of dirty pages to be flushed by the cache flushing task scheduled for execution.

In addition, in the absence of a significant change in the rate at which client application IOs generate dirty pages in the buffer cache, the dirty pages can be flushed at a relatively constant rate proportional to the number of dirty pages in the cache so that each dirty page is flushed within a desired persistence time since the page became dirty in the cache. The persistence time can be less than a certain persistence time limit and is calculated as the number of the dirty pages in the cache divided by the storage array bandwidth (B) used for writeback of the dirty pages from the cache memory to the disk array. The combination of the rate proportional flushing and the water level proportional flushing in effect predicts and compensates in a stochastic manner for unexpected very large fluctuations in the application I/O rate. This stochastic approach will ensure with high probability a minimum I/O stoppage time for the application without measuring instantaneous storage array throughput, but with knowledge of a maximum storage array disk throughput. For example, the forgetting factor is proportional to the ratio between the average disk write I/O latency and the maximum latency of the disk array.

By performing writeback of dirty pages based on the rate of change in the number of dirty pages in the cache memory, the writeback task uses a closed-loop feedback control method. Thus, the cache memory can be viewed as part of a dynamic closed loop system including the client and the storage server. In the traditional case the client-server loop was closed by the use of commits issued by the client to the server after the I/O was acknowledged by the server.

Figure 3:
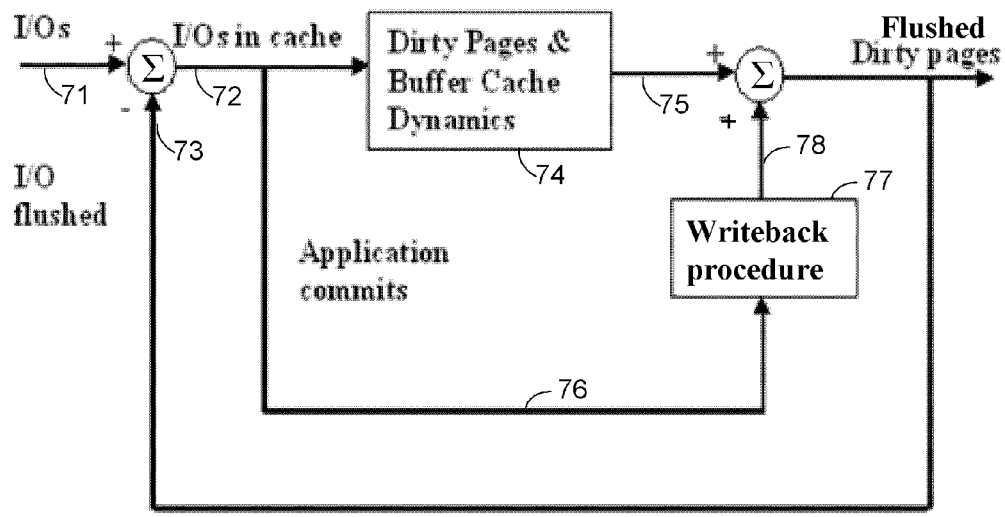
FIG. 3 is a feedback control circuit model of a writeback cache in which the flushing of dirty pages is based on client application commits.

As shown in the closed loop model of FIG. 3, for the case of older NFS client applications, an NFS client sends write I/Os 71 to an NFS server, waits for the server acknowledgement, and then sends a commit to the server, and waits until the server flushes the written pages to disk storage. Upon receiving a commit request, the server initiates writing the I/O to disk and waits for the I/O to complete before acknowledging the commit to the client.

The write I/Os 72 in cache are equal to the write I/Os 71 from the client minus the I./Os 73 flushed. The dirty pages and buffer cache dynamics 74 may cause least recently used pages to be flushed on a priority basis, for example when the cache gets full of dirty pages and free pages are needed for servicing read or write requests. A writeback procedure 77 also flushes dirty pages 78 in response to application commits 76. The sum of the dirty pages 77 flushed by the buffer cache dynamics 74 and the dirty pages flushed by the writeback procedure 77 are the total dirty pages flushed 73.

The server must ensure that the metadata associated with the file was updated before sending the acknowledgement of the commit to the client. As a result the client sends the I/O and the commit and waits for the acknowledgement from the server before sending additional write I/Os. So this is a closed loop behavior as the error is zero only at the time when the dirty pages were flushed and only then will the client send the next write.

We can consider the error 72 as the difference between the number of write I/Os 71 sent by the client to the server and the number of pages 73 flushed to disk. The error will represent the amount of dirty pages in the buffer cache of the server. The closed loop ensures that the level of dirty pages in the buffer cache is driven to zero, with a delay of the round trip of the write I/O and the commit acknowledgements.

In order to improve write performance modern applications send multiple I/Os without sending to the server or the file system any commits requiring the server to writeback the dirty pages. Typically the flushing of dirty pages is based on a watermark of the dirty pages in the cache.

Figure 4:
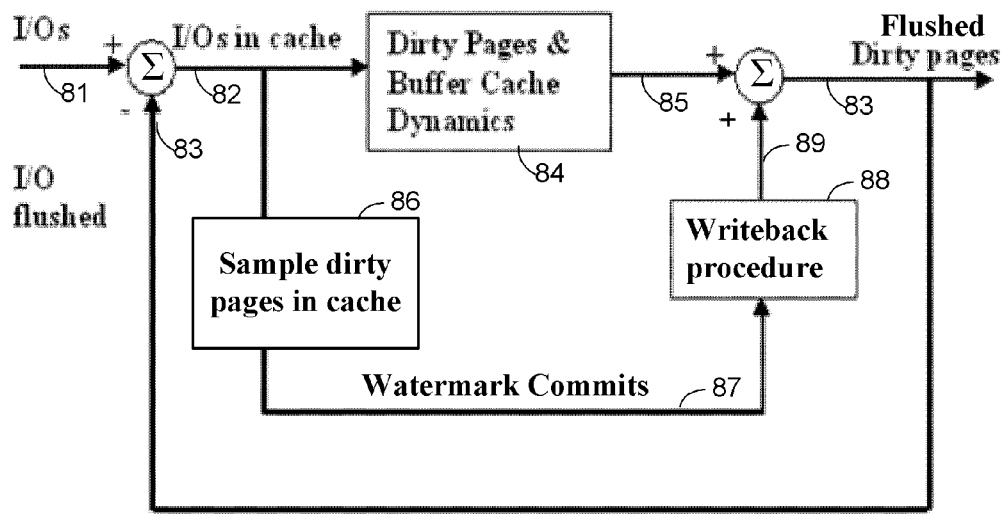
FIG. 4 is a feedback control circuit model of a writeback cache in which the flushing of dirty pages is based on a watermark of the dirty pages in the cache.

FIG. 4 shows a feedback control circuit model of a writeback cache using the watermark method of cache flushing. The write I/Os in cache 82 are equal to the write I/Os 81 from the client minus the I./O's flushed 83. The dirty pages and buffer cache dynamics 84 may cause least recently used pages to be flushed on a priority basis, for example when the cache gets full of dirty pages and free pages are needed for servicing read or write requests. A writeback procedure 88 also flushes dirty pages 78 in response to watermark commits 87 produced when sampling 86 finds that the number of dirty pages in the cache reaches a high watermark. The sum of the dirty pages 85 flushed by the buffer cache dynamics 84 and the dirty pages flushed by the writeback procedure 88 are the total dirty pages flushed 83.

FIG. 4 presents a case when the server cannot keep up and flush at the speed of write I/Os sent by the client. In this case the server returns acknowledgement to the client to each I/O and a commit as soon as the metadata of the file is flushed. It is possible that the speed of dirty pages flush is slower than the arrival rate of I/Os. As a result the client doesn't wait for the acknowledgement of the commit before sending the next write I/O request.

There is a disconnect between the time when the client sends the I/O and the moment when the dirty page is flushed to disk as the flush is based on the watermark of dirty pages in the buffer cache crossing a certain threshold value. In this case the dirty page generated by the client at time t0 is flushed at a much later time depending on the speed of arrival of dirty pages and the speed of the flush to disk at time t1.

As a result of this delay (t1−t0) and nonlinear behavior, the system enters into an oscillatory behavior reducing the speed of the I/Os. In FIG. 4 the loop is closed by measuring the water level of dirty pages in the buffer cache at the time that the metadata of the file is flushed which is different than the number of dirty pages flushed to disk. The flush is controlled by measuring the water level in the buffer cache of the server which is disconnected from the client write speed. In fact the loop is opened between the watermark flushes as the feedback does not respond to the increase in the number of dirty pages sent by the clients until the threshold is reached.

The ideal case would be to measure the number of I/Os sent by the clients to the server. But even if one measures the client I/Os on each client we should get the global number of dirty pages in the system in a distributed manner which would be inaccurate when sent to the server. An alternative would be to measure the number of I/Os before the dirty pages are sent to the cache memory. This also is not feasible as the network layer does not know that the request will result in a dirty page until the page is marked as dirty in the cache memory.

In order to be able to reduce the delay in the system we should flush the dirty pages proportionally to the number of arriving dirty pages or the rate of incoming I/Os. While we cannot measure accurately the generation of dirty pages by the clients we can accurately estimate the rate of arrivals of dirty pages with a much lower delay from the generation time at the clients. If the flush will be done proportional to the arrival rate, assuming that the throughput to storage is lower than the maximum throughput of the array. If this can be achieved then the performance will increase up to the point when the storage throughput equals the maximum.

Figure 5:
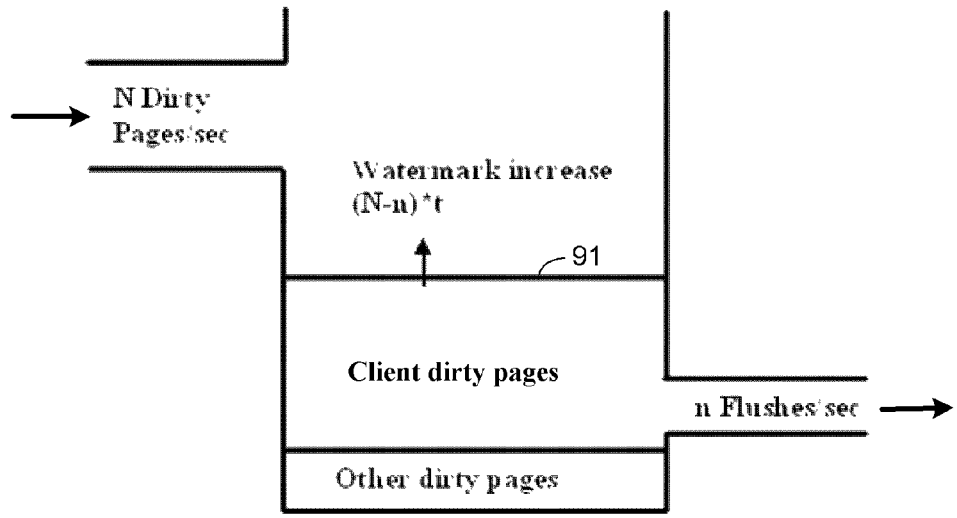
FIG. 5 is a schematic diagram of a trickle flush mechanism for writeback of dirty pages from the cache.

Any other flushing mechanism will keep the delay in the system high enough to keep the loop opened. For example a "trickle" mechanism can be optimized for a certain maximum throughput. As shown in FIG. 5, the trickle mechanism is viewed as a type of open loop actuator that flushes dirty pages from the cache memory a fixed speed.

The number of dirty pages in the cache will continue to increase at the rate proportional to the difference between the rate (N) of dirty pages arriving in the cache and the rate (n) of flushing dirty pages using the "trickle" mechanism. As "n" is constant and "N" can vary, for high arriving I/O rates, we can end up with N>n and then the number of dirty pages will increase at the speed of N−n. If we want to ensure that the dirty page water level is kept constantly low in the worst case scenario we should make "n" equal to the maximum inbound throughput arriving from the network (Nmax). The problem with this approach is that the flush will still be un-throttled depending on the incoming rate of dirty pages. So, a "trickle writeback" mechanism will just reduce the delay in the loop by flushing dirty pages arriving at the server faster than when watermarks are used.

Figure 6:
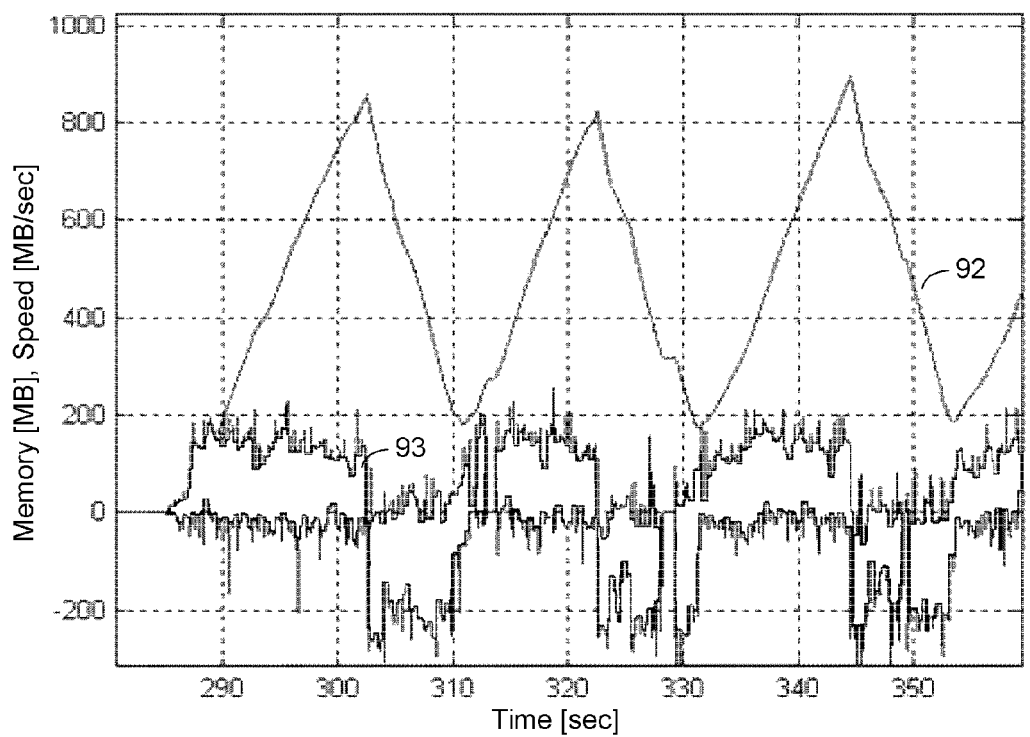
FIG. 6 is a graph of the number of dirty pages in the cache as a function of time and the rate of change of the number of dirty pages for the trickle flush method.

In order to evaluate the non-linear effect of high delays we instrumented an EMC Corporation CELERRA® brand NFS server to allow measuring the level of dirty pages in the buffer cache of the server (for 5 GB cache size) as well as the dirty page arrival rate. FIG. 6 shows, in an upper trace 92, the oscillatory behavior of the water level in the buffer cache due to alternate periods of I/O arrivals and cache writeback at maximum speed to the storage. During the writeback the I/O rate is reduced and will impact the write performance of the server. FIG. 6 also shows, in a lower trace 93, the rate of change of the dirty pages.

Figure 7:
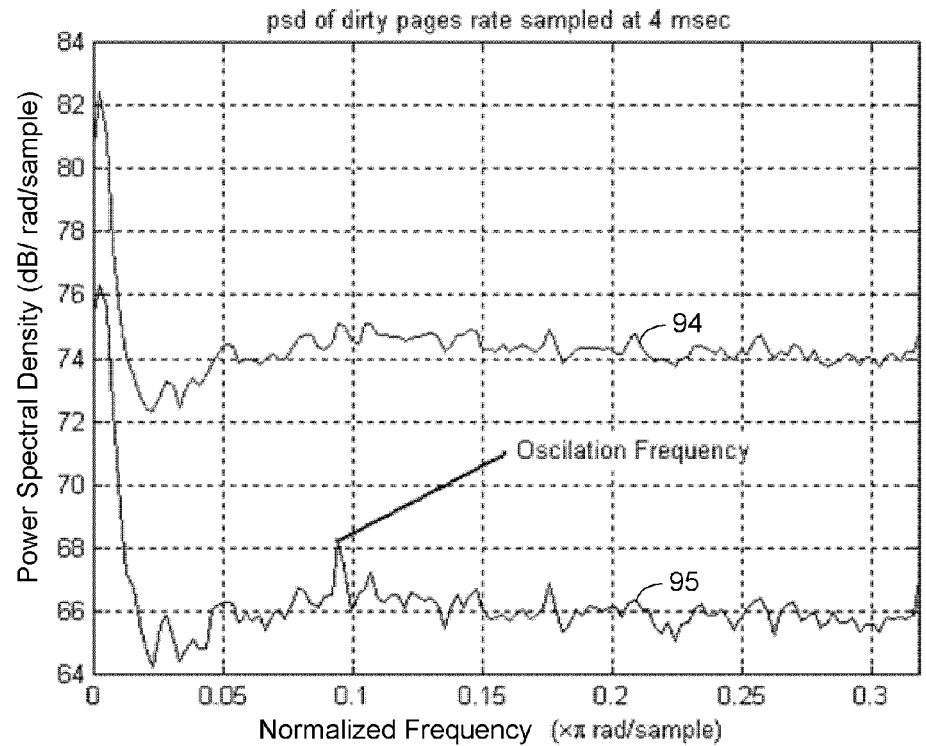
FIG. 7 is a graph of the power spectral density as a function of normalized frequency for the number of pages in the cache and the rate of change in the number of dirty pages for the trickle flush method.

We also analyzed the spectrum of both water level and rate of change of dirty pages in the buffer cache. FIG. 7 shows, in an upper trace 94, the Power Spectral Density (PSD) of the rate of change of dirty pages in the buffer cache. FIG. 7 also shows, in a lower trace 95, the PSD of the water level. The water level PSD has a peak oscillation frequency at about 0.3 rad/sec.

In view of the above observations, we developed and examined a number of different cache writeback procedures, each designed to more closely match the flush rate to the rate of incoming modifications. In general we chose to look primarily at writeback procedures that were self tuning. This was because choosing tuning parameters can be difficult and may not work well in highly dynamic situations. These writeback procedures sample the count of dirty pages in the cache repetitively over a small sampling period, as part of the criteria for determining the output flush rate. For all of the traces we examined the input rate of modification is significantly lower than the maximum output bandwidth. In general this means that there is sufficient write bandwidth available to write back the number of dirty pages scheduled by these writeback procedures.

The cache writeback procedures that we developed and examined include a modified trickle flush, a fixed interval procedure, a variable interval procedure, a quantum flush, and a rate of change proportional procedure. Simulation and experimental results, as further described below, indicate that the rate proportional method is reasonably easy to implement and provides a low stoppage time. The simulations also show that the variable interval procedure also has good behavior under rapid input changes. Therefore specific examples of the rate of change proportional procedure and the variable interval procedure will be described first using knowledge gained from the simulations and experiments, and then the specific procedures used in the simulations and experiments will be described, followed by the results of the simulations and experiments.

Figure 8:
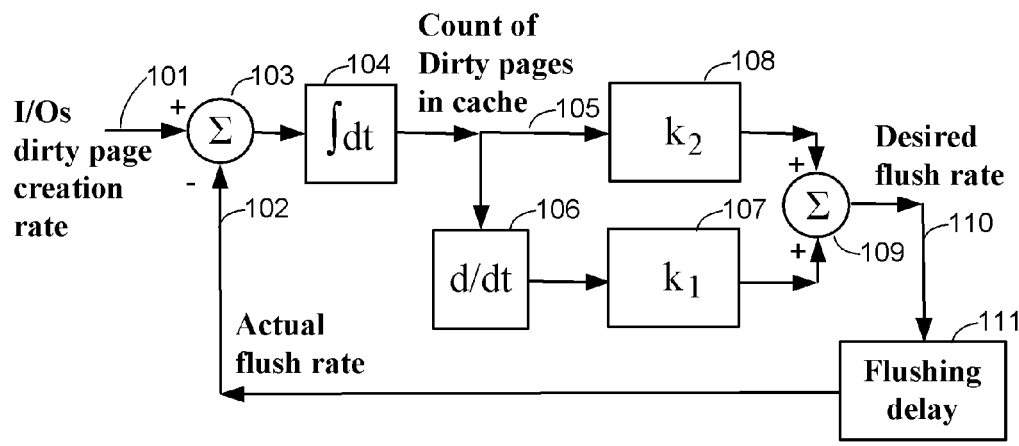
FIG. 8 shows a feedback control circuit model of a proportional-derivative method of cache writeback in accordance with the present invention.

FIG. 8 shows a feedback control circuit model of the rate of change proportional procedure of cache writeback. This circuit model shows that the requested flush rate 110 is controlled in response to the rate 101 at which dirty pages are created by I/Os even though the rate of change proportional procedure uses the rate of change in the count 105 of the dirty pages in cache 95 as a substitute for measurement of the rate at which the dirty pages are created by the I/Os. The mechanism of creating dirty pages in the cache and flushing the dirty pages from the cache insures that the count 105 of the dirty pages in the cache is the integral 104 of the difference 103 between the dirty page creation rate 101 and the actual flush rate 102. The rate of change proportional procedure takes the rate of change 106 of the count 105 of dirty pages in cache and multiplies the rate of change 106 by a first factor ($k_1$) 107 to produce a first term in a sum 109 producing the desired flush rate 101. The count 105 of the dirty pages in the cache is multiplied by a second factor ($k_2$) 108 to produce a second term in the sum 109 producing the desired flush rate 110. After a flushing delay 111 the desired flush rate 110 becomes the actual flush rate 102.

In a specific example, the first factor ($k_1$) is a constant of about 1.0 and the second factor ($k_2$) determines the persistence time of the dirty pages in the cache. Although the second factor could be a constant, it is desirable for the second factor to decrease with an increasing rate of change in the number of dirty pages in the cache so that when the rate of change in the number of dirty pages in the cache is equal to the maximum storage array throughput, dirty pages will be written from the cache memory back to the storage array at the maximum storage array throughput independent of the level of the cache. These conditions will occur if the first factor ($k_i$) is equal to one and the second term is equal to a constant (a) times (B−R)/B, where "R" is the rate of change in the number of dirty pages in the cache, and "B" is the maximum storage array throughput for flushing dirty pages from the cache. The constant (a) determines the persistence time of a dirty page in the cache.

Figure 9:
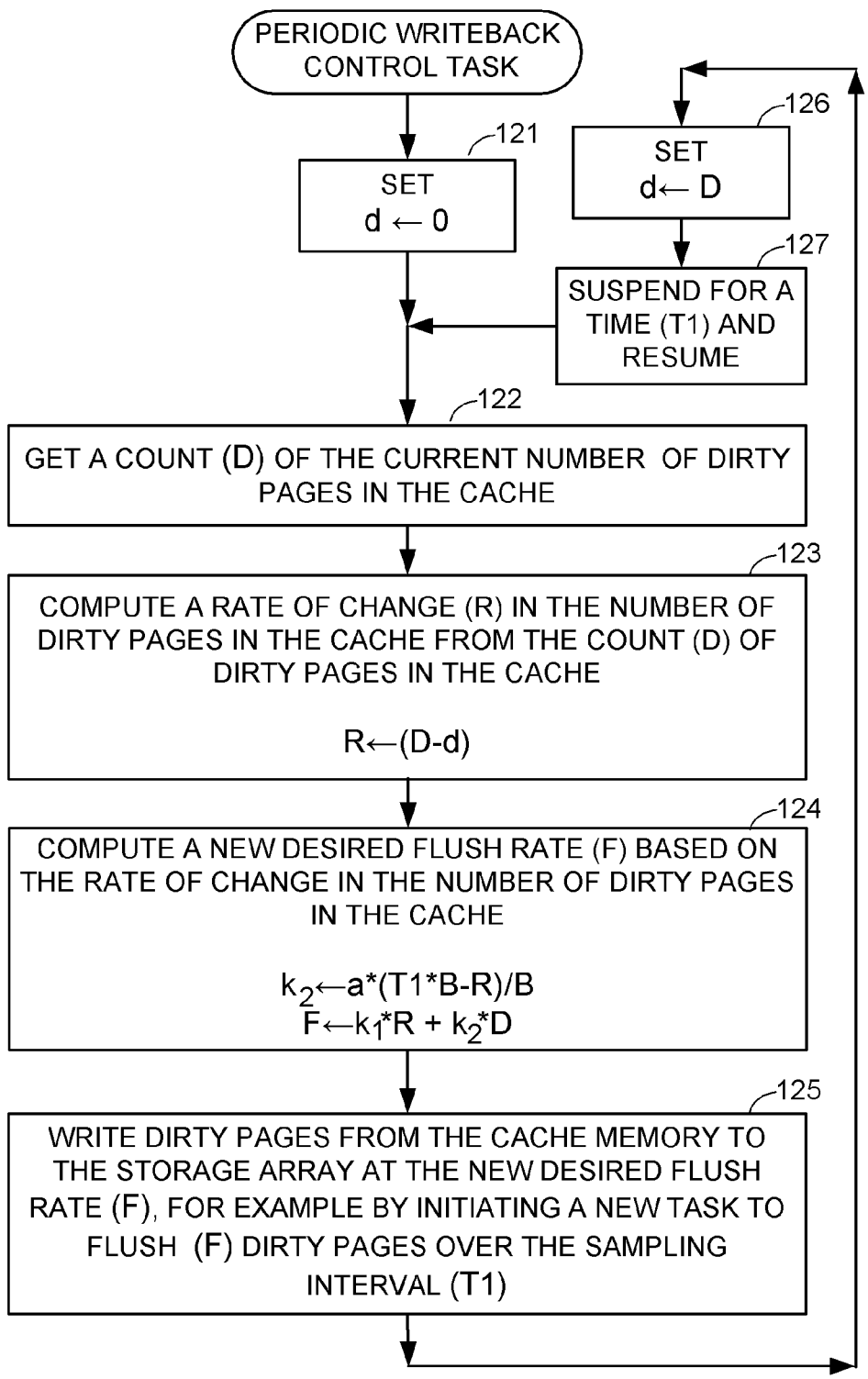
FIG. 9 is a flowchart of a periodic writeback control task for a rate-of-change proportional method in accordance with the present invention.

FIG. 9 is a flowchart of a periodic writeback control task using the rate-of-change proportional procedure of FIG. 8. In a first step 121, a variable (d), having a value indicating the number of dirty pages in the cache for the previous iteration, is set to zero. Next, in step 122, a count (D) of the current number of dirty pages in the cache is fetched form the cache manager. The count (D) is the number of entries in the dirty LRU list (55 in FIG. 1). In step 123, a rate of change (R) in the number of dirty pages in the cache is computed from the count (D) of dirty pages in the cache. In this example, the rate of change (R) is computed as the difference between the current number (D) of dirty pages in the cache and the number (d) of dirty pages in the cache at the time of the last iteration. Thus, the rate of change (R) has units of dirty pages per sampling interval.

In step 124, a new desired flush rate (F) is computed based on the rate of change (R) in the number of dirty pages in the cache. In this example, the computation includes computing a first term ($k_1$*R) proportional to the rate of change (R) in of dirty pages in the cache memory, and computing a second term ($k_2$*D) proportional to the number of dirty pages in the cache memory. The factor ($k_1$), for example, is equal to one, and the second term ($k_2$*D) is proportional to the number of dirty pages in the cache memory by a factor ($k_2$) proportional to a difference (T1*B−R) between the maximum bandwidth (T1*B) of the storage array (in units of pages per sampling interval) and the rate of change (R) in the number of dirty pages in the cache memory (also in units of pages per sampling interval). Thus, the units of B in this example are pages per second.

In step 125, dirty pages are written from the cache memory to the storage array at the new flush rate (F), for example by initiating a new task to flush (F) dirty pages over an iteration interval (T1). In step 126, the value of the variable (d) is set equal to the value of the variable (D). In step 127, execution of the periodic writeback control task is suspended for the remainder of the sampling interval (T1) and then execution resumes at the next sampling time and loops back to step 122.

For the periodic write control task of FIG. 9, it is desired for the sampling interval (T1) to be rather short so as to minimize the delay with which the writeback control task responds to changes in the rate at which application I/Os generate dirty pages. However, an extremely short sampling interval (T1) increase the processing overhead of the writeback control task itself and also the flushing task is less inefficient if it flushes a smaller number of pages each time that the flushing task is invoked. Therefore, under normal circumstances, there is certain sampling interval (T1) that is a good tradeoff between the desire for the writeback control loop to have a fast response to changes in the rate of creation of dirty pages and the processing overhead of the writeback control task and the flushing task.

Abnormal loading conditions sometimes occur in a data network having a large number of clients sharing a storage system. Therefore, in such an environment it may be advantageous to provide a variable sampling interval (T1) so that the sampling interval is relatively long under low loading conditions, and relatively short under high loading conditions. For example, it may be desirable to use a shorter than normal sampling interval (T1) and give the flushing task a higher priority (just below the priority of servicing a client I/O) if the shorter than normal sampling interval and the higher priority flushing task would help prevent the cache from becoming filled with dirty pages.

Figure 10:
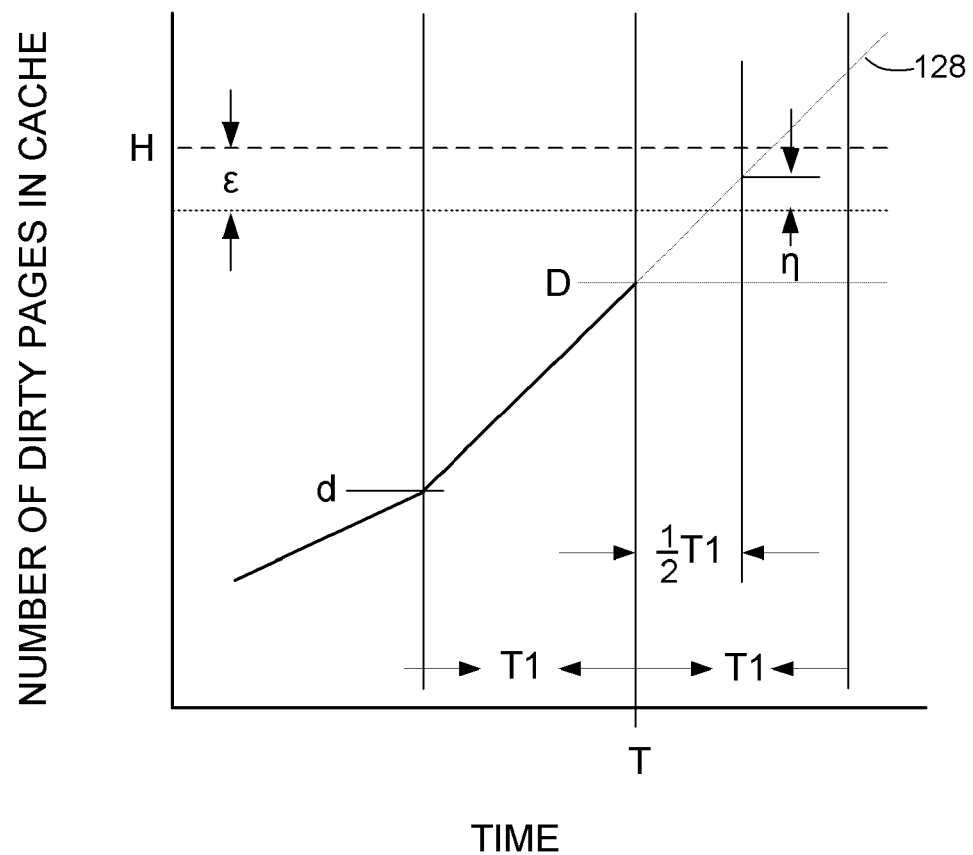
FIG. 10 is a graph of the number of dirty pages in cache as a function of time for the periodic writeback control method for a case in which the number of dirty pages in cache approaches a high water mark.

FIG. 10, for example, shows a situation at a certain time (T) when it is likely that the number of dirty pages in the cache would exceeded a high water mark (H) at the end of the next iteration cycle if the rate of change in the number of dirty pages would continue to increase at its current rate (along the dotted line 129). This condition can be expressed as D+R>H, where R=D−d. Projection along the dotted line 129 assumes that the rate of creating new dirty pages in the cache would continue at the rate of creation over the last sampling interval ending at time T, and also assumes that the rate of flushing dirty pages from the cache would continue at the rate of flushing over the last sampling interval. Under these circumstances, it may be desirable to reduce the sampling interval (T) and issue a priority request to flush at an increased rate so that the number of dirty pages in the cache would not be likely to exceed the high water mark (H).

For example, it is desired under these circumstances to reduce the sampling interval by one half, and to increase the flushing rate so that at the end of the next iteration cycle (at a time T+½T1) the number of dirty pages in the cache would not exceed the high water mark (H) less a certain number (ϵ) of dirty pages assuming that the current rate of creation of dirty pages would continue throughout the next iteration cycle. Therefore, under the circumstances of FIG. 10, the flushing task initiated at about the current time (T) should have flushed an additional number (ii) of dirty pages by the time (T+½T1), where η=D+½R−H+ϵ. In this case, assuming that the number of pages flushed over the last iteration cycle of duration T1 was F, a total number of ½F+η dirty pages should be flushed over the next iteration cycle of duration ½T1.

Figure 11:
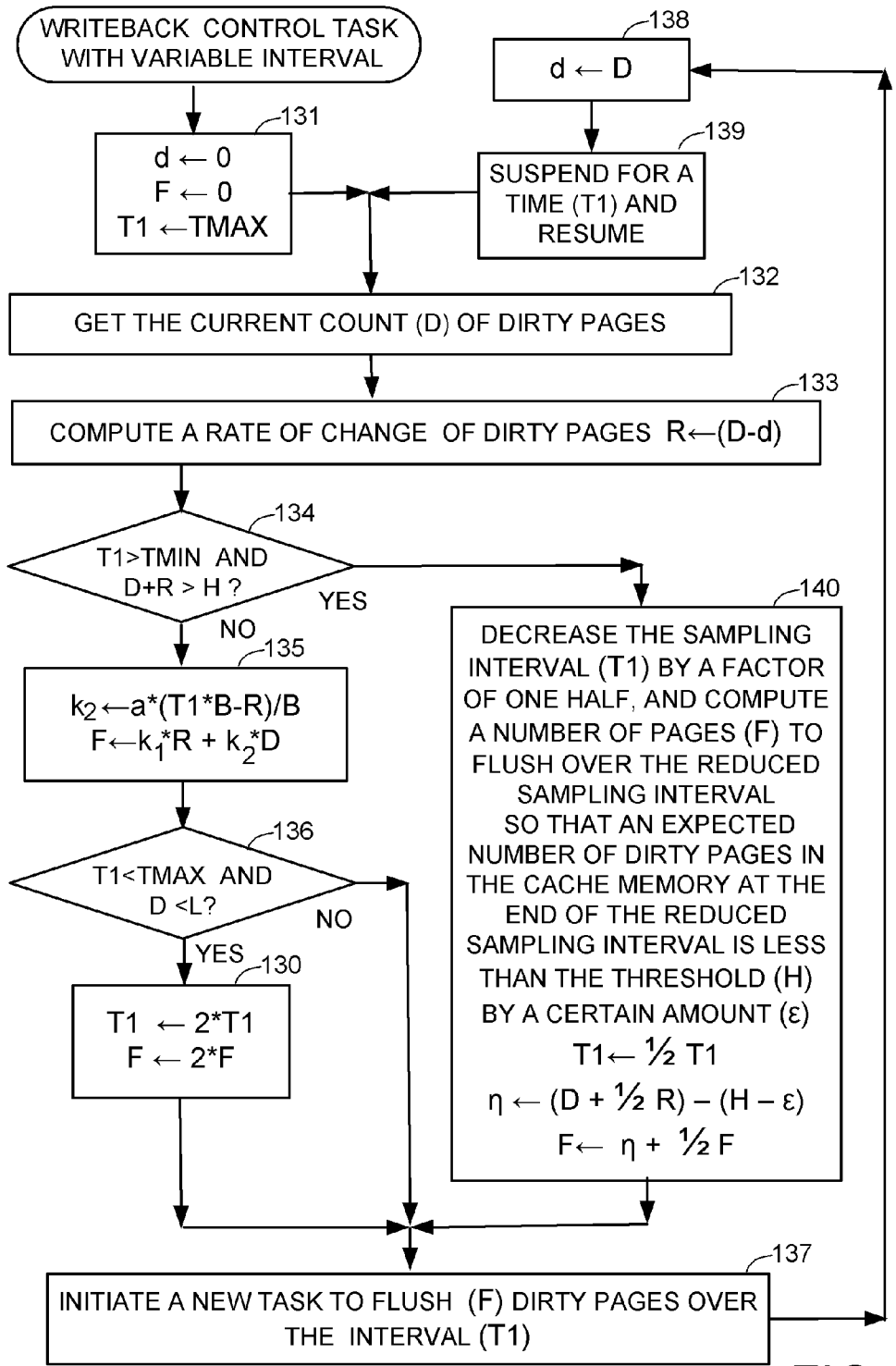
FIG. 11 is a flowchart of a writeback control task for a variable interval method in accordance with the present invention.

FIG. 11 shows a flowchart of a writeback control task for a variable interval method operating as described above with respect to FIG. 10. In this example, if the number of dirty pages in the cache is not projected to reach the high water mark (H), then the writeback control procedure performs an iteration using the rate-of-change proportional procedure of FIG. 8.

In a first step 131 of FIG. 11, the variables (d) and (F) are set to zero, and the sampling interval (T1) is set to a maximum value (TMAX). In step 132, the current count (D) of dirty pages is obtained from the cache manager. In step 133, a rate of change (R) of the dirty pages is computed as R←(D−d). In step 134, the sampling interval (T1) is compared to a minimum value (TMIN), and if the sampling interval (T1) is not greater than the minimum value (TMIN), then execution continues to step 135. Otherwise, in step 134, the sum of the current number (D) of dirty pages and the rate of change (R) is compared to the high watermark (H), and if the sum D+R is not greater than the high water mark (H), then execution continues to step 135.

In step 135, a new desired number of dirty pages to flush (F) is computed as $k_2 \leftarrow a*(T1*B-R)/B$ and $F \leftarrow k_1*R+k_2*D$. In step 136, the sampling interval (T1) is compared to the maximum value (TMAX), and if the sampling interval is not less than TMAX, then execution continues to step 137. Otherwise, in step 136, if the current count (D) of dirty pages is not less than a low water mark (L), then execution also continues to step 137. In step 137 a new task is initiated to flush (F) dirty pages over the interval (T1). In step 138, the value of (d) is set equal to the value of (D). In step 139, execution of the writeback control task is suspended for an interval of time (Ti), and then execution loops back to step 132.

In step 134, if the sampling interval (T1) is greater than the minimum value (TMIN) and the sum D+R is greater than the high water mark (H), then execution continues to step 140. In step 140, the sampling interval (T1) is decreased by a factor of one half, and a new desired number of pages to flush (F) over the reduced sampling interval is computed so that an expected number of dirty pages in the cache memory at the end of the reduced sampling interval is less than the threshold (H) by a certain amount (ϵ). For example, T1←½T1, (D+½R)−(H−ϵ), and F←η+½F. Execution continues form step 140 to step 137.

Steps 134 and 140 may cause the sampling interval T1 to ratchet down from TMAX to TMIN under high loading conditions. Steps 136 and 130 may cause the sampling interval T1 to ratchet back up to TMAX under low loading conditions. In step 136, if T1<TMAX and D<L, then execution continues to step 130. In step 130, the sampling interval is increased by a factor of two, and desired number of dirty pages to flush (F) is increased by a factor of two. Execution continues form step 130 to step 137. Following is a description of the cache writeback procedures that were simulated. The first procedure that was simulated was a modified trickle flush. Initial implementations of trickle flush used background scheduled tasks to writeback dirty pages with lower priority compared to the metadata and user committed write I/Os. As a result the efficiency of the trickle flush was limited to low I/O traffic. Similar trickle implementations used a wakeup time of 5-10 sec and flush a limited number of pages, Q, as a background task.

As an improved version we measured the rate of change of dirty pages average for each interval between wakeups, reduced to 1 sec, and increased the number of flushed buckets proportional to the rate of change or the number of dirty pages arriving at the server, d. The procedure still flushed a limited number of pages, a proportion, p, of the total number of dirty pages at wakeup time. Also we modified the flush tasks to be continuous, not limited to the wakeup time but given higher priority between the timeouts. One more enhancement was to change the number of flush threads, Th, to be proportional to the rate of change of dirty pages.

We used as input the sampled values from the real server that use the current writeback behavior including the current trickle flush implementation. We simulated the new procedure using Matlab SIMULINK, with the input as defined before.

The second cache writeback procedure that we simulated was a Fixed Interval (FI) procedure. This procedure depends on having a "goal" number of dirty pages in the system. The goal may change over time as memory usage patterns change; however, the procedure still tracks against the goal in force at the time of the interval expiration.

The fixed interval procedure chooses the number of pages to flush based on the how much we exceed the goal number. The procedure is implemented using the following set of variables:

G: the goal or maximum desired number of dirty pages
D: the actual number of dirty pages
d: the number of pages to flush
where $$d=\{0, \text{ for } D<=G; 2*(D-G), \text{ for } D>G\} \quad (1)$$

Thus if at the expiry the number of dirty pages D is less than the goal number G, we do not schedule any pages for flushing. Otherwise, we schedule to flush twice the number of pages by which D exceeds G.

The third cache writeback procedure that we simulated was a Variable Interval (VI) procedure. The VI procedure is somewhat more complicated as it attempts to estimate the modification rate to be used in calculating an output rate. It operates in a different manner than FI in the way it treats its goal value. Where FI tries to converge on the goal, VI tries to never exceed the goal value.

VI uses the net change in the number of dirty pages (i.e., all newly modified pages less any pages that are flushed). It then uses the calculated modification rate and the current number of dirty pages to predict when the goal would be reached (or exceeded). The flush rate is then calculated such that the flushing within the next interval would be sufficient to match the input rate assuming the input rate remains constant. The variables of the procedure were:

H: high water mark
D: current modified page count
$t_i$: initial base time interval
t: last time interval
d: count of modified pages in last time period
c: pages to flush in the next time interval
T: current time
I: ingest rate
F: predicted full time
σ: correction factor
The VIA procedure is as follows:

$$I=d/t \quad (2)$$

$$F=T+(M-D)/I \quad (3)$$

If F<T+t then, $$c = (M-D) + \sigma, F < (T+t) \quad (4)$$

$$t = t_i \quad (5)$$

else, $$t = t/2 \quad (6)$$

$$c = t*I + \sigma \quad (7)$$

The VI procedure attempts to choose a flush task workload that will prevent the modified count from reaching the high water mark. By increasing the number of pages flushed by σ the procedure slightly exceeds the recent input rate. When the input rate becomes high enough that we would reach the high water mark in less than time t, the time interval is halved. This has the effect of doubling the effect of σ and negating the increased modification rate.

The fourth cache writeback procedure that we simulated was a Quantum Flush. This procedure is based on the idea of a goal where each dirty page will be flushed within a given time period. This period is referred to as the quantum, Q. The flush time is a goal and there are no actual timestamps associated with the buffers. Instead, the scheduling of flushes is done based on an approximation, which assumes a relatively uniform distribution of arrival times. Thus the procedure wakes up n times per Quantum or on a sub-quantum time of q, where q is Q/n. At the expiration of each sub-quantum, 1/nth of the dirty pages are scheduled for flushing.

This procedure can be applied to either client data or metadata, but was particularly designed for metadata, because there is a requirement to flush all metadata within a certain time period.

The procedure depends on having an ordered list of pages to be flushed. The pages are kept in a First Modified order. Thus, pages that were modified first will be flushed first, regardless of whether there were more recent references to the page. This ordering is consistent with the ordering required to be able to release file journal entries.

The fifth cache writeback procedure that we simulated was a rate of change proportional procedure. This is the simplest procedure that we implemented and it is probably the most efficient except for the fact that the rate of change cannot be measured beyond an average value estimated from the change of dirty pages in the buffer cache during the sample interval. The measurement of the level in the buffer cache is an indirect measurement of the difference between the incoming dirty pages and the speed of write to disk. The procedure combines rate based and water level based flushing to disk. The procedure is rate based to respond to large unexpected increase in the write I/O arrival time in the cache. The procedure is also water level based to account for the fact that the number of dirty pages is bounded and the maximum writeback rate is limited by the maximum throughput of the storage array or backend disk. The procedure used the following parameters:

ti: previous sample time
t: last sample time
W: count of dirty pages in the buffer cache
R: rate of change of W during last sample time in pages/sec
c: pages to flush in the next time interval
B: maximum bandwidth of the storage array in pages/sec
μ: forgetting factor accounting for fast changes in R
α: ratio of average/maximum disk latency (0<α≦1)

The rate of change proportional procedure will flush dirty pages proportional to the rate of change of the water level in the buffer cache and additional portion of the current water level W. The second term accounts for the case when there is a rapid change in the rate of dirty pages generated by the application.

$$c = R*(t-ti) + W*\mu \quad (8)$$

$$\mu = \alpha*(B-R)/B \quad (9)$$

The a rate of change proportional procedure assumes that the average rate of dirty pages in the buffer cache is lower than the maximum flush speed to the storage array over a long period of time while the instantaneous rate of dirty pages may be higher than the maximum storage array throughput.

Figure 12:
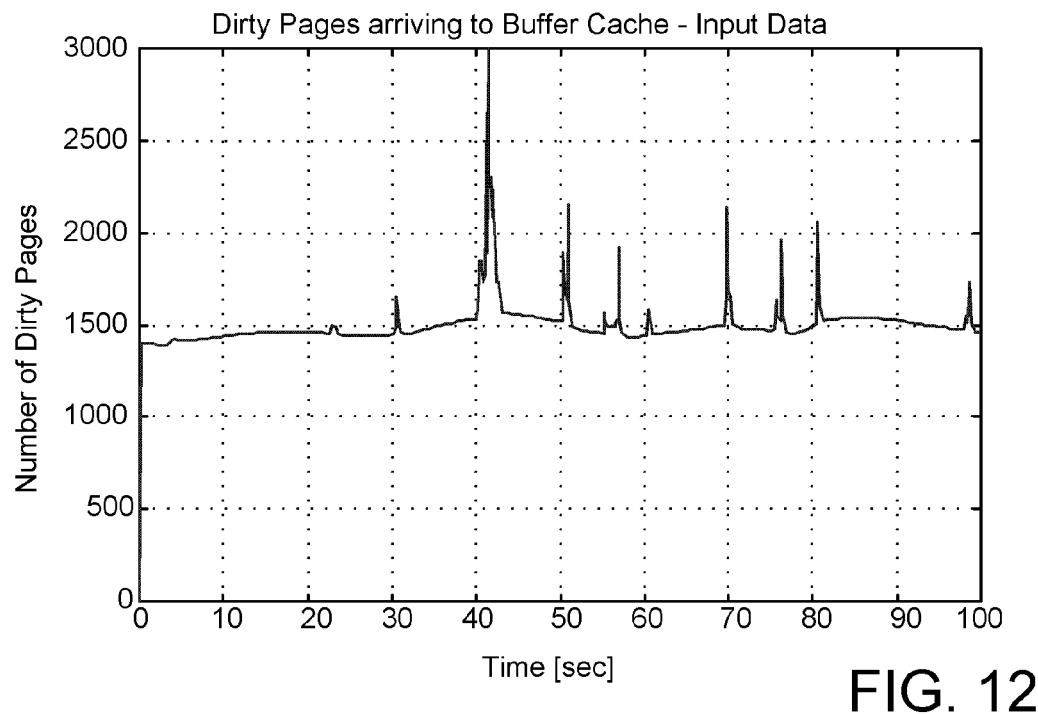
FIG. 12 is a graph of the number of dirty pages as a function of time used as input data for simulations.

In order to evaluate the value of the five procedures discussed above, we instrumented an EMC Corporation CELERRA® brand file server to measure the number of dirty pages in its buffer cache with 4 msec time resolution. We used eight NFS clients running random write I/Os to the server using the 10 meter performance tool. The I/O pattern was random write and the start time of the I/O on each client was scheduled in such a manner to generate bursts of I/Os by increasing the number of clients starting I/Os at same time. At the time the test started there were dirty pages in the buffer cache from previous I/O on a single client. We sampled the change of the buffer cache level during the entire test and used this data as input to our simulation. FIG. 12 shows the input data used in our simulation.

In order to simulate the behavior of the dirty pages for different procedures we wrote a simulation program in Matlab SIMULINK. The input to the simulation was the number of dirty pages change during the sample interval of 4 msec. This is an indirect measure of the number of user I/Os but was a good enough approximation for evaluation of our five cache writeback procedures.

Additionally we instrumented the CELERRA® server code to simulate in line the expected behavior of the cache writeback procedure by computing the flush commands during I/O operations of the server running SPEC sfs2008 benchmark without changing the current procedures used by the server. The results of the in-line simulation validated the Simulink simulation results.

Figure 13:
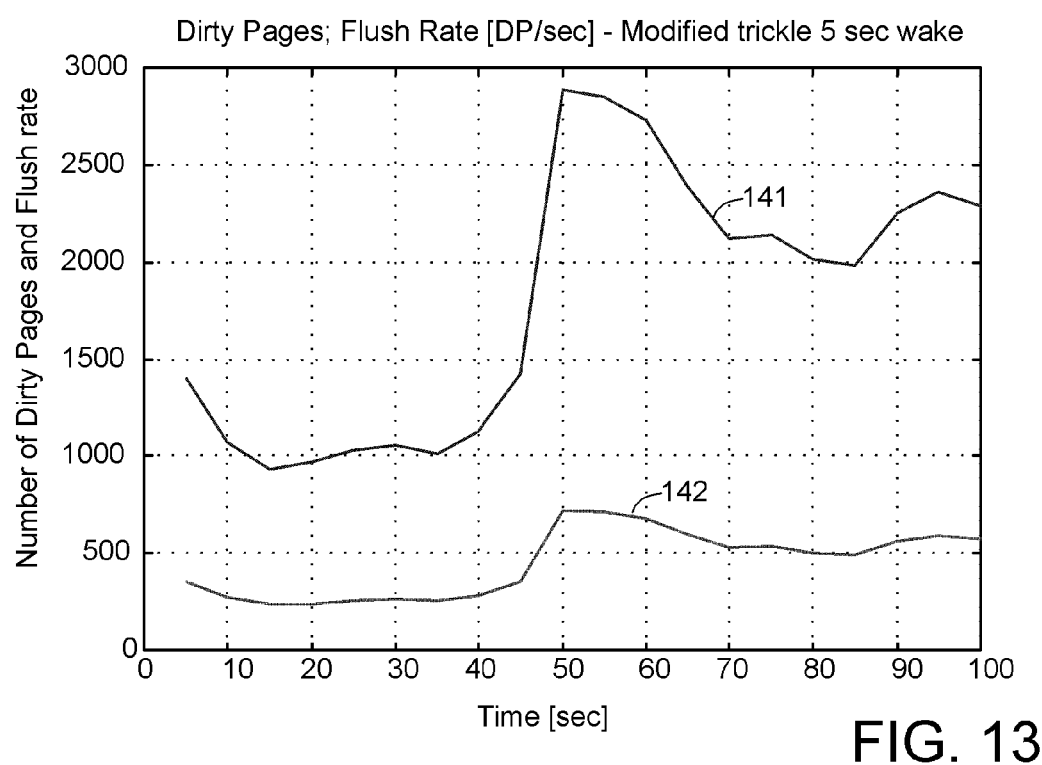
FIG. 13 is a graph of the number of dirty pages and flush rate as a function of time for a simulation of a modified trickle method using a wake time of 5 seconds.
Figure 14:
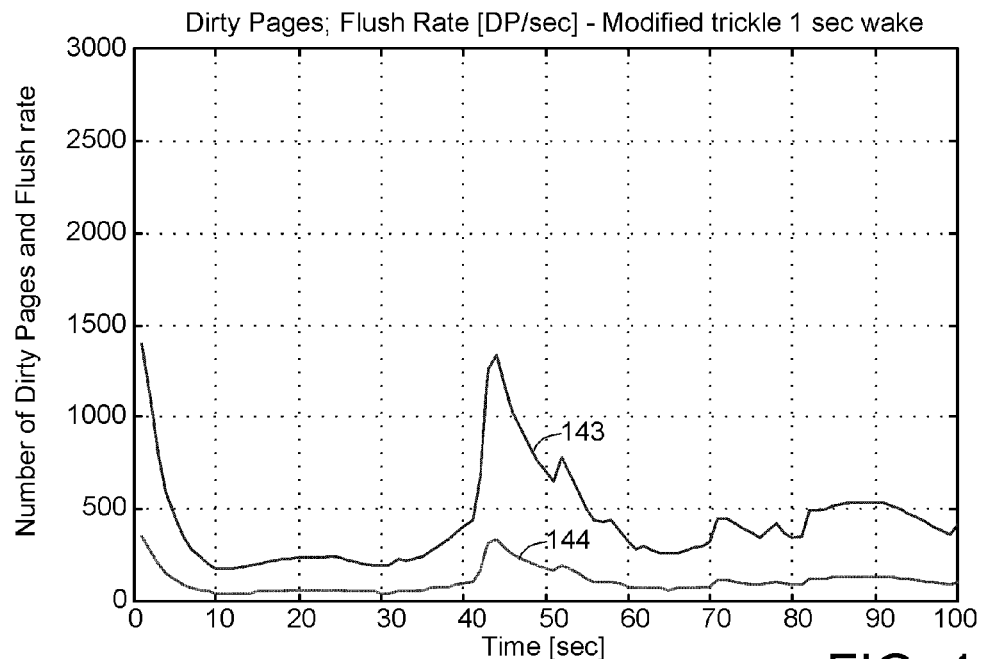
FIG. 14 is a graph of the number of dirty pages and flush rate as a function of time for a simulation of a modified trickle method using a wake time of 1 second.

We ran the simulation for the trickle flush procedure for two values for the wakeup time; 5 sec as currently implemented in the server and 1 sec. We started a number of threads proportional to the number of dirty pages that arrived during the time between waking instances with a maximum of 32 threads for flushing dirty pages at each wakeup instance. We flushed 1/128 of the total number of dirty pages in the buffer cache at the wakeup time. If the active threads didn't finish their work by the next wakeup time we continue the work items and added more items according to the new number of dirty pages but not more than 32. The results of the simulation of the two cases are presented in FIGS. 13 and 14. FIG. 13 show the behavior of the number of dirty pages in the buffer cache for a wake time of 5 sec similar to the current implementation but we added multiple flush threads. The upper trace 141 in FIG. 13 is the number of dirty pages in the buffer cache, and the lower trace 142 is the flush rate. FIG. 14 shows the case of wake of 1 sec while we kept the maximum number of threads bounded by 32. The upper trace 143 in FIG. 14 is the number of dirty pages in the buffer cache, and the lower trace 144 is the flush rate.

The results show that the wake time of 1 sec kept a lower level of dirty pages in the buffer cache because we did not reduce the maximum number of threads proportionally to the wake time. As a result the dirty pages flush command for 1 sec is lower than the case of 5 sec but the number of dirty pages is lower than for 5 sec. The 1 sec case show that the level of the water is kept low in the buffer cache but in both cases the sharp change in the incoming I/O showing a poor reaction to the fast changes of the incoming application I/O. This procedure has the potential of improving the behavior to large changes in the input but may require more CPU usage for very large caches. It is more suitable for slower changing metadata flush.

Figure 15:
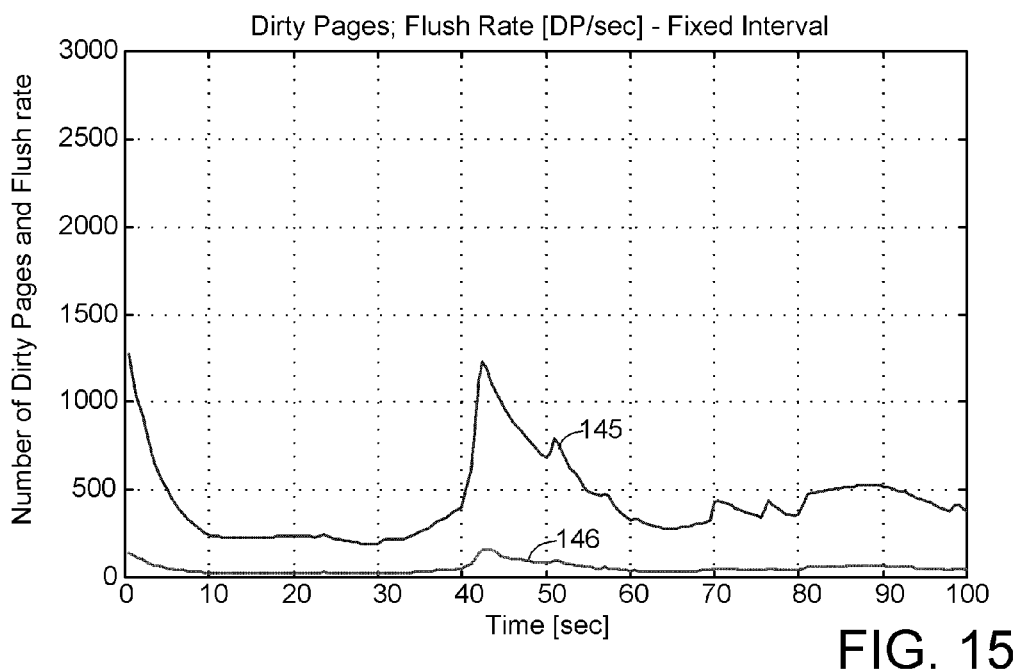
FIG. 15 is a graph of the number of dirty pages and flush rate as a function of time for a simulation of a fixed interval method with a goal of 250.

We repeated the same simulation as before but we changed the flushing procedure to the fixed interval (FI) procedure. We used the same input data and same simulation model as before. FIG. 15 shows the output of the simulation of the FI procedure with a goal G of 250 dirty pages. The upper trace 145 in FIG. 15 is the number of dirty pages in the buffer cache, and the lower trace 146 is the flush rate. The results are very similar to the modified trickle procedure with the exception that the flush rate is lower and the peak is also lower. Similar to modified trickle with 1 sec this procedure keeps the level of dirty pages in the buffer cache low as long as the incoming rate is moderate. In the case of large variations of the input this procedure performs poorly and it misses the goal for long periods of time long after large variations in the incoming I/O rate ends. Although it keeps the dirty pages under control at a lower level it is not suitable for random I/Os that can change significantly between sampling intervals. The procedure is also very sensitive to the sampling time as the increase in sample time can contribute to a higher change in the incoming I/O stream during a larger sampling interval. Although it may not be suitable for user data flush that can change rapidly it is a good candidate for flushing metadata such as indirect or directory blocks that do not change as rapidly as the user data.

So far the simulation results show that dirty pages flushing by the number of dirty pages are not able to cope well with large rapid changes in the input. To address this problem we added a new component to the flush procedure; namely, a term proportional to the rate of change of the dirty pages in the buffer cache, which is proportional to the change in the number of user I/Os. The VI procedure is an attempt to combine equally flush by goal and by rate.

Figure 16:
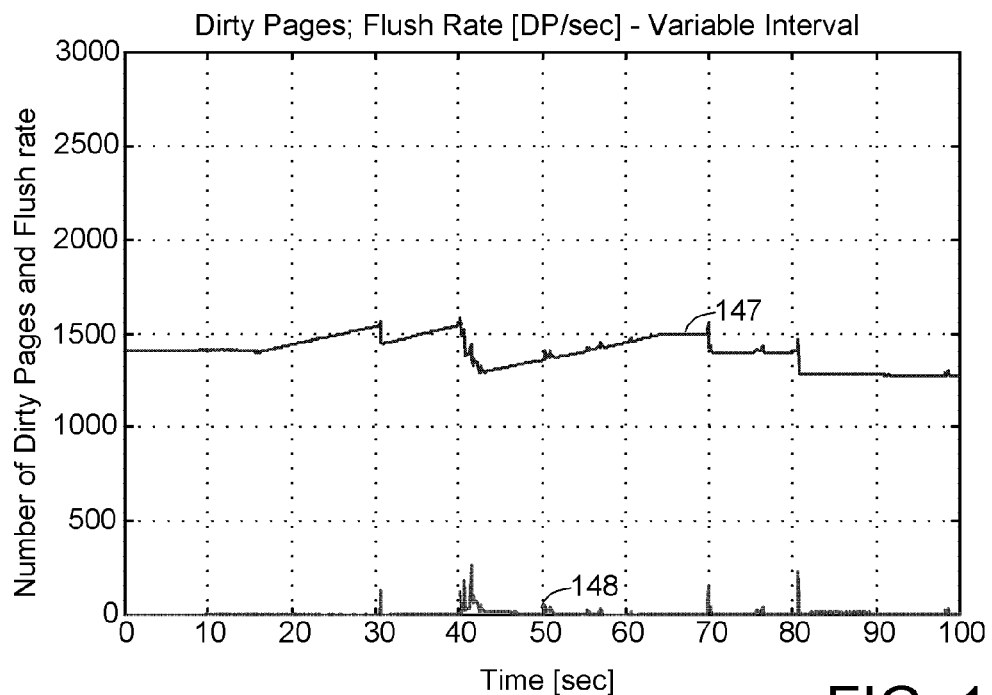
FIG. 16 is a graph of the number of dirty pages and flush rate as a function of time for a simulation of a variable interval method.

FIG. 16 shows the simulation results of the VI procedure. We used the same input as before. The upper trace 147 in FIG. 16 is the number of dirty pages in the buffer cache, and the lower trace 148 is the flush rate. The simulation results show that the VI procedure copes graciously with the rapid changes in the incoming user I/Os but has a hard time flushing dirty pages that are already in the buffer. The reason is that the flush commands are much lower than in the FI procedure but respond much faster to the change in the input independent of the sampling time which is variable and it adapts itself to the change. Although the procedure succeeds in reducing the number of recent dirty pages it has difficulties reducing the total number of dirty pages and it takes a long time to achieve the water level goal. This procedure is suitable for flushing fast changing user data and less suitable for metadata.

Figure 17:
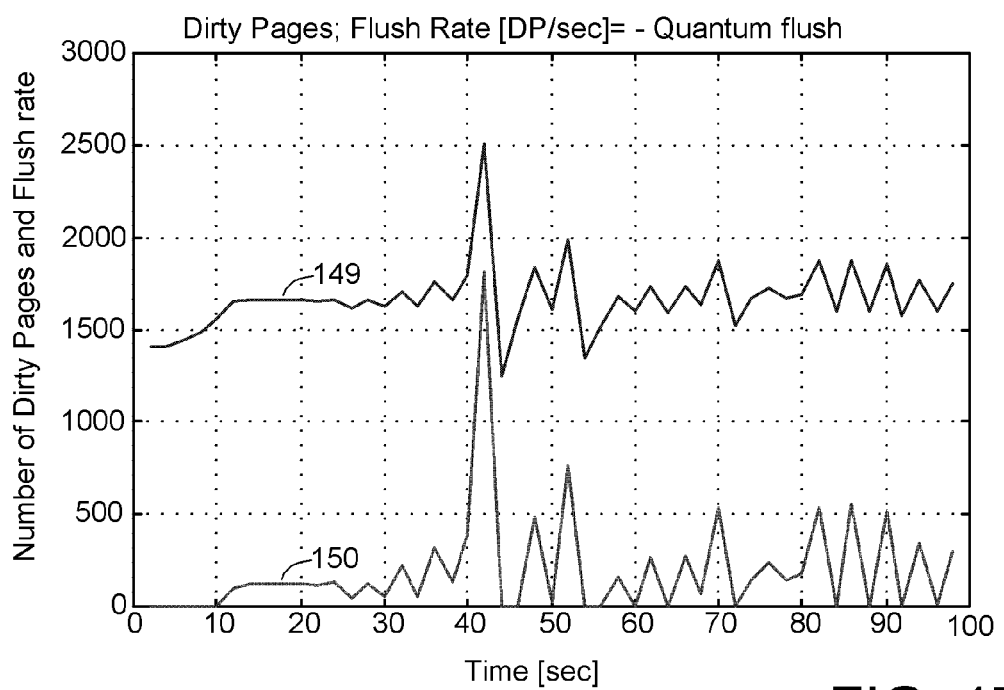
FIG. 17 is a graph of the number of dirty pages and flush rate as a function of time for a simulation of a quantum flush method.

FIG. 17 shows the simulation results for the quantum flush with a quantum Q of 5 sec and weight n=20. The upper trace 149 in FIG. 16 is the number of dirty pages in the buffer cache, and the lower trace 150 is the flush rate. The quantum flush procedure is similar to the VIA in that it has a term proportional to the rate of change and a smaller component proportional to the level of dirty pages in the buffer cache. The effect of the flush by rate is that it compensates for fast changes in the I/O rate but with a delay of 1/n of sample time. As a result the flushing is more oscillatory and could bring some I/O stoppage in extreme cases. As a result of a smaller dirty pages proportional term it has difficulty in reducing the water level in the buffer cache. But instead it follows closely the changes in the input and compensates for rapid changes that happen over long intervals. The flush command is larger than FI as a result of the fact that it compensates for each change in the incoming I/O with a delay of 250 milliseconds missing the change in the input during the sampling interval. This procedure is mostly suitable for metadata that has lower fluctuations in the rate of change than user data.

Figure 18:
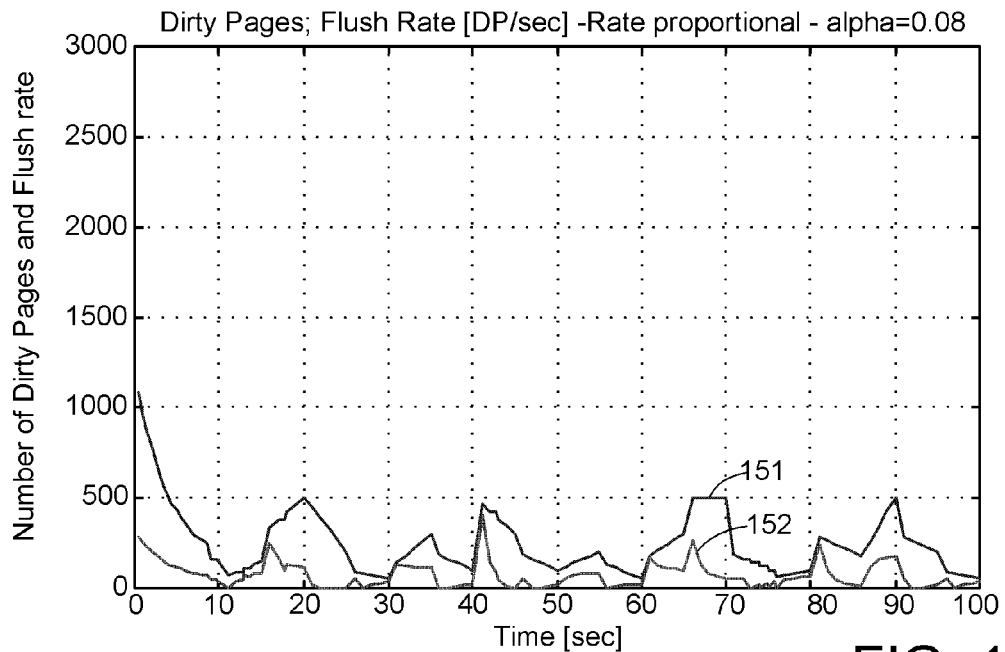
FIG. 18 is a graph of the number of dirty pages and flush rate as a function of time for a simulation of a rate proportional method using an alpha of 0.08.
Figure 19:
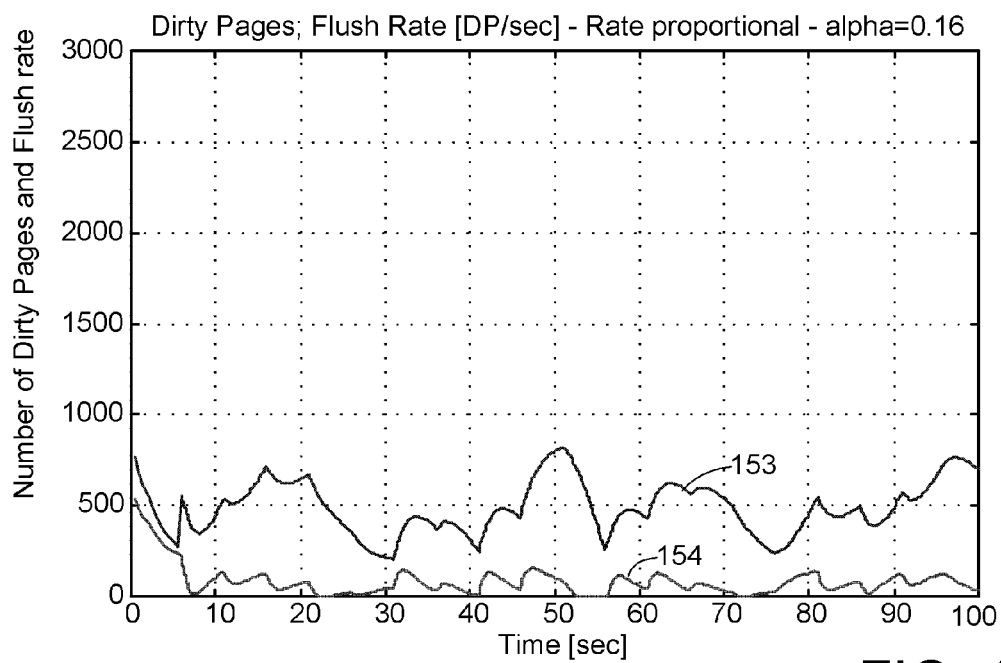
FIG. 19 is a graph of the number of dirty pages and flush rate as a function of time for a simulation of a rate proportional method using an alpha of 0.16.

FIGS. 18 and 19 show the simulation results for the rate of change proportional flush. The rate of change proportional flush generates the flush command using a mix of rate of change proportional term and a term which compensates for the number of dirty pages in the buffer cache depending on the available I/O throughput of the disk. The second term will increase the flush command proportional to the available I/O throughput and will ensure fast flush of any dirty pages accumulated due to fast changes in the incoming I/O rate. In effect the second term acts as a forgetting factor that will preempt the buffer cache before the rate change happens. The indirect effect will be to predict the change and compensate for it if the flush throughput is lower than the maximum disk throughput. As the input rate becomes closer to the maximum the input I/O will be slowed before any stoppage will happen.

We simulated the rate proportional flush for two values of the forgetting factor $\alpha$ assuming different maximum disk throughput: 0.08 and 0.16. FIG. 17 shows the simulation results for the first throughput value of 0.08. The upper trace 151 in FIG. 18 is the number of dirty pages in the buffer cache, and the lower trace 152 is the flush rate. FIG. 19 shows the simulation results for the second throughput value of 0.16. The upper trace 153 in FIG. 19 is the number of dirty pages in the buffer cache, and the lower trace 154 is the flush rate.

The results show that the water level in the buffer cache is kept very low regardless of the spikes in the incoming I/O rate. For the case of 0.08, representing a faster disk, shown in FIG. 18, we observe that the flush of the initial value of dirty pages is slower but the level in the buffer cache is lower as well. The reason is that the rate proportional term can flush at a higher speed and keep up with the incoming I/O rate while flushing less of the dirty pages in the buffer cache by effectively giving a lower priority to buffers in the buffer cache than to the incoming I/O stream. When the flush throughput to disk is getting close to the maximum the accumulated pages will be flushed only when there is no change in the incoming rate and will postpone user I/O stoppage until there is a large accumulation in the buffer cache. In the case of FIG. 19 representing a slower disk there will be an increase in the forgetting term which will flush faster the dirty pages in the buffer cache but will reduce the flush for the rate factor. In this case the water level in the buffer cache will decrease faster but it will remain higher as the rate factor flushes at lower rate to disk. This case is similar to the case of the flush rate approaching maximum disk throughput. This procedure can be tuned differently for user data and metadata and it can be used for both types of dirty pages.

After we compared the five different cache writeback procedures using the simulation we decided to implement some of them in the CELERRA® server and run SPEC sfs2008 NFS benchmark. We decided to implement two of the procedures; the modified trickle that was easy to implement as a small modification of the current trickle implementation, and the rate proportional procedure that was the most promising. The target of the experiment was to observe the impact of both procedures on the stoppage of application I/Os. We ran the benchmark at the peak performance point which is very close to the maximum I/O throughput of the storage array.

Figure 20:
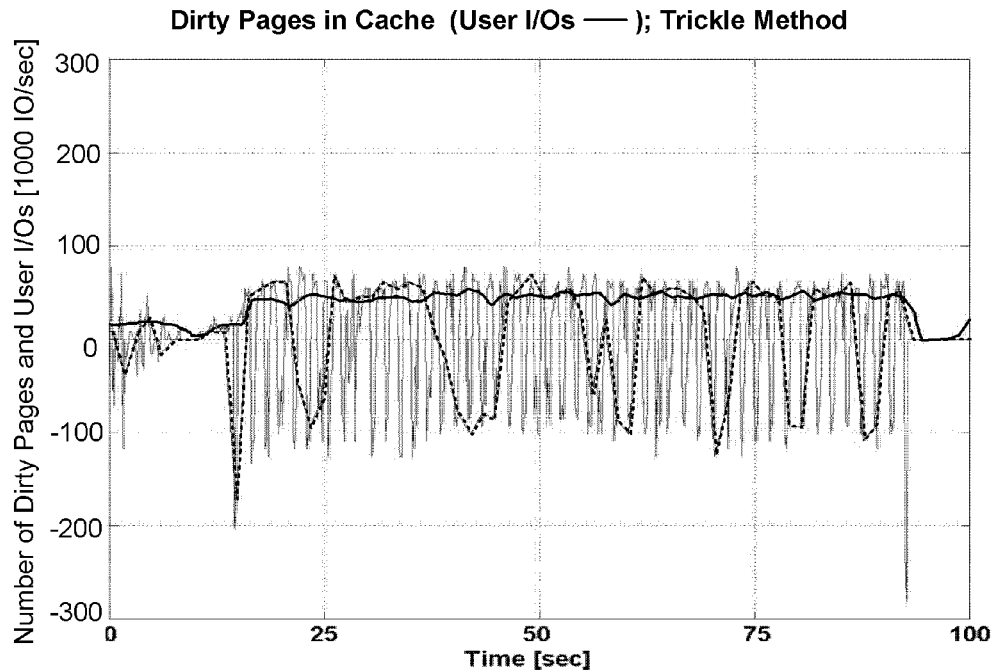
FIG. 20 is a graph of the number of dirty pages and flush rate as a function of time for experimental results of a modified trickle method.
Figure 21:
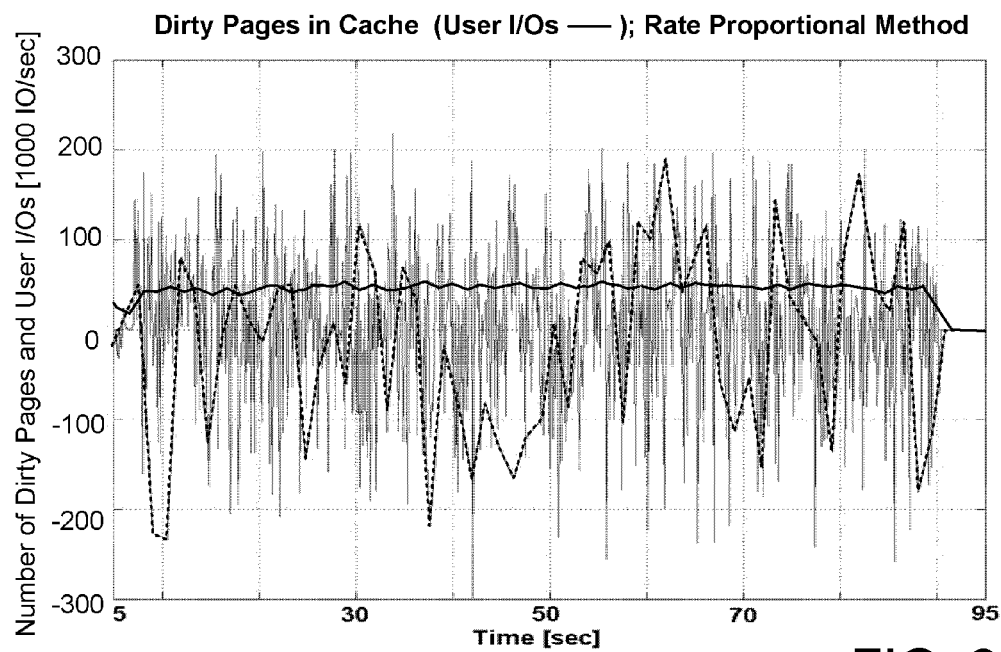
FIG. 21 is a graph of the number of dirty pages and flush rate as a function of time for a rate proportional method.

The results of the tests are not conclusive about the occurrence of any I/O stoppage as we could not monitor the NFS clients to see if the I/O stopped. Instead we monitored the derivative of the number of dirty pages in the buffer cache and concluded that when the derivative is negative it will incur a virtual stoppage of incoming I/Os. In reality it could be that if the rate of flush is higher than the rate of application incoming I/Os the derivative will be negative, which is enough of a performance penalty to be reduced to a minimum. FIG. 20 shows the behavior of the rate of dirty pages in buffer cache for the modified trickle procedure and FIG. 21 shows behavior of the rate of dirty pages in buffer cache for the rate proportional procedure. In each of FIGS. 20 and 21 the heavy solid line show user I/Os, and the light solid line shows the number of dirty pages in the cache.

The results of the test show that the both procedures track the incoming NFS I/Os closely but the possible stoppage time is much lower for the rate proportional procedure. As FIG. 20 shows the incoming I/O rate is tracking well with the NFS I/Os but there are frequent stoppages of 1-2 seconds as the negative peaks average is 90 k while the average of the NFS I/Os is only 55 k. On the other hand FIG. 21 shows that the stoppage time is lower than 200 milliseconds and the average of the negative derivative is about 60 k.

This is a good proof that the flush rate is very close to the rate of the incoming I/Os, which means that a server using the rate proportional procedure can achieve higher performance because there is more room for flushing at higher I/O throughput available to the storage array. Additionally the burstiness of the I/O to the storage is reduced when flushing proportional to the incoming I/O rate. We believe that both the simulation and the experimental results prove that the rate proportional procedure is the best candidate for a cache writeback procedure for reducing the number of dirty pages and keeping them low as the incoming application I/Os are coming at a rate lower than the maximum I/O throughput of the storage array.

As described above, we introduced five cache writeback procedures that flush at a rate that is based on a count of the number of dirty pages in the cache. We compared these five cache writeback procedures using SIMULAB simulation and in-line simulation on the server. We also performed experiments on a real NFS server running a performance benchmark using two of the cache writeback procedures.

Figure 22:
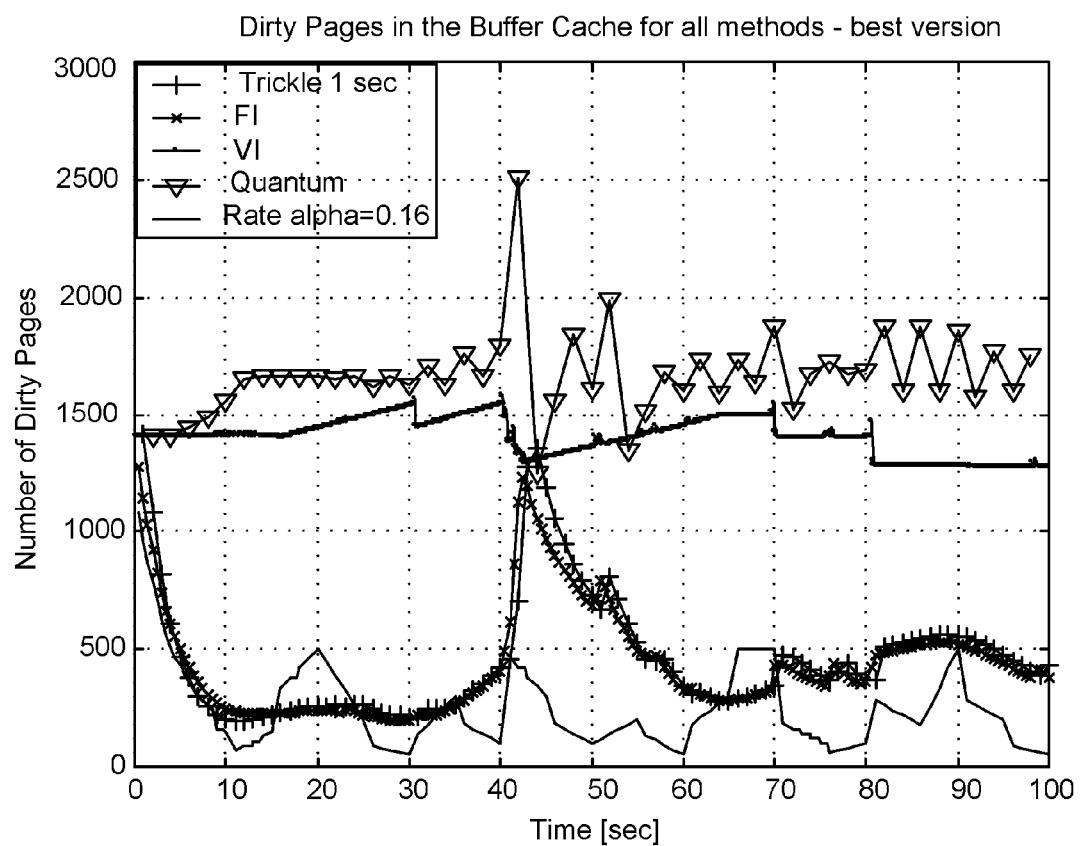
FIG. 22 is a graph of the number of dirty pages and flush rate as a function of time for various methods.

A comparison of all five procedures shows that the rate component has a smoothing effect on incoming I/O bursts. FIG. 22 shows that the procedures using some kind of rate component have lower peak of dirty pages than the ones that use no rate component. FIG. 22 shows that both the rate proportional and variable interval procedures that include rate compensation have the best behavior under rapid input rate changes, while the balanced rate and number of pages proportional procedures also keep a very low level of dirty pages in the buffer cache of the server.

The forgetting factor has a significant contribution in reducing the level of dirty pages when there is enough disk I/O throughput available due to its adaptive nature that allows flushing more pages when the storage array is less busy.

As a result of the simulations we changed the performance goal of the cache writeback technique from reducing the number of dirty pages in the cache toward reducing the stoppage in the application I/O to the servers and file systems and even preventing the I/O stoppage completely. Additionally we expect that any flush procedure used will have a minimal impact and incur minimal to no application performance degradation until the disk becomes the bottleneck. We also observed that rate proportional procedures have an advantage over watermark procedures as they can track more accurately the I/O behavior of the application and send it to the storage preventing unexpected burstiness of the I/O to the storage array. In addition the rate proportional flush procedures better cope with sharp changes in the incoming I/O rate while preventing stoppages in I/O by smoothing the flush to the storage array. Moreover, adding a proportional forgetting factor will help predict bursts of incoming I/Os and flush the dirty pages more evenly.

What is claimed is:

1. A computer-implemented method of cache writeback in a data storage system, the data storage system including a cache memory, a storage array, and a data processor coupled to the cache memory and coupled to the storage array for modifying pages of data in the cache memory so that a number of the pages in the cache memory become dirty, and writing the dirty pages from the cache memory to the storage array so that the dirty pages become clean, the method comprising the data processor executing computer instructions stored on a non-transitory computer-readable storage medium to perform the steps of:

(a) obtaining a count of the number of dirty pages in the cache memory; and (b) based on the count of the number of dirt pages in the cache memory obtained in step (a), writing the dirt pages from the cache memory to the storage array at a rate having a component proportional to a rate of change in the number of dirty pages in the cache memory;

wherein step (b) includes:

computing a first term proportional to the rate of change in the dirty pages in the cache memory, and adding the first term to a second term to compute a desired rate for writing the dirty pages are written from the cache memory to the storage array; and writing the dirty pages from the cache memory to the storage array at the desired rate.

2. The computer-implemented method as claimed in claim 1, which includes computing the second term proportional to the count of the number of dirty pages in the cache memory obtained in step (a).

3. The computer-implemented method as claimed in claim 2, which includes computing a difference between a maximum bandwidth of the storage array and the rate of change in the number of dirty pages in the cache memory, and computing the second term proportional to the computed difference between the maximum bandwidth of the storage array and the rate of change in the number of dirty pages in the cache memory.

4. A computer-implemented method of cache writeback in a data storage system, the data storage system including a cache memory, a storage array, and a data processor coupled to the cache memory and coupled to the storage array for modifying pages of data in the cache memory so that a number of the pages in the cache memory become dirty, and writing the dirty pages from the cache memory to the storage array so that the dirty pages become clean, the method comprising the data processor executing computer instructions stored on a non-transitory computer-readable storage medium to perform the steps of:

(a) obtaining a count of the number of dirty pages in the cache memory; and (b) based on the count of the number of dirty pages in the cache memory obtained in step (a), writing the dirty pages from the cache memory to the storage array at a rate having a component proportional to a rate of change in the number of dirty pages in the cache memory;

wherein step (b) includes computing a change in the number of dirty pages in the cache memory over an interval of time, and computing a number of the dirty pages to be written from the cache memory to the storage array over the interval of time from the computed change in the number of dirty pages in the cache memory over the interval of time, and writing, from the cache memory to the storage array, the computed number of the dirty pages to be written from the cache memory to the storage array over the interval of time.

5. A computer-implemented method of cache writeback in a data storage system, the data storage system including a cache memory, a storage array, and a data processor coupled to the cache memory and coupled to the storage array for modifying pages of data in the cache memory so that a number of the pages in the cache memory become dirty, and writing the dirty pages from the cache memory to the storage array so that the dirty pages become clean, the method comprising the data processor executing computer instructions stored on a non-transitory computer-readable storage medium to perform the steps of:
 (a) obtaining a count of the number of dirty pages in the cache memory; and
 (b) based on the count of the number of dirty pages in the cache memory obtained in step (a), writing the dirty pages from the cache memory to the storage array at a rate having a component proportional to a rate of change in the number of dirty pages in the cache memory;
 wherein step (b) includes computing the rate of change in the number of dirty pages in the cache memory over a first interval of time, and the method further includes determining whether the change in the number of dirty pages over the first interval of time plus the count of the number of dirty pages in the cache memory obtained in step (a) exceeds a threshold, and upon determining that the change in the number of dirty pages over the first interval of time plus the count of the number of dirty pages in the cache memory obtained in step (a) exceeds a threshold, computing a number of dirty pages to be written from the cache memory to the storage array over a second interval of time less than the first interval of time, and writing, from the cache memory to the storage array over the second interval of time, the computed number of the dirty pages to be written from the cache memory to the storage array over the second interval of time.

6. The computer-implemented method as claimed in claim 5, wherein step (b) computes the number of dirty pages to be written from the cache memory to the storage array over the second interval of time so that an expected number of dirty pages in the cache memory at the end of the second interval of time is less than the threshold by certain amount.

7. A data storage system comprising:
 a cache memory,
 a storage array, and
 a data processor coupled to the cache memory and coupled to the storage array for modifying pages of data in the cache memory so that a number of the pages in the cache memory become dirty, and writing the dirty pages from the cache memory to the storage array so that the dirty pages become clean, and
 a non-transitory computer readable storage medium storing computer instructions that, when executed by the data processor, perform the steps of:
 (a) obtaining a count of the number of dirty pages in the cache memory; and
 (b) based on the count of the number of dirty pages in the cache memory obtained in step (a), writing the dirty pages from the cache memory to the storage array at a rate having a component proportional to a rate of change in the number of dirty pages in the cache memory;
 wherein step (b) includes:
 computing a first term proportional to the rate of change in the dirty pages in the cache memory, and adding the first term to a second term to compute a desired rate for writing the dirty pages are written from the cache memory to the storage array; and writing the dirty pages from the cache memory to the storage array at the desired rate.

8. The data storage system as claimed in claim 7, which includes computing the second term proportional to the count of the number of dirty pages in the cache memory obtained in step (a).

9. The data storage system as claimed in claim 8, which includes computing a difference between a maximum bandwidth of the storage array and the rate of change in the number of dirty pages in the cache memory, and computing the second term proportional to the computed difference between the maximum bandwidth of the storage array and the rate of change in the number of dirty pages in the cache memory.

10. A data storage system comprising:
 a cache memory,
 a storage array, and
 a data processor coupled to the cache memory and coupled to the storage array for modifying pages of data in the cache memory so that a number of the pages in the cache memory become dirty, and writing the dirty pages from the cache memory to the storage array so that the dirty pages become clean, and
 a non-transitory computer readable storage medium storing computer instructions that, when executed by the data processor, perform the steps of:
 (a) obtaining a count of the number of dirty pages in the cache memory; and
 (b) based on the count of the number of dirty pages in the cache memory obtained in step (a), writing the dirty pages from the cache memory to the storage array at a rate having a component proportional to a rate of change in the number of dirty pages in the cache memory;
 wherein step (b) includes computing a change in the number of dirty pages in the cache memory over an interval of time, and computing a number of the dirty pages to be written from the cache memory to the storage array over the interval of time from the computed change in the number of dirty pages in the cache memory over the interval of time, and writing, from the cache memory to the storage array, the computed number of the dirty pages to be written from the cache memory to the storage array over the interval of time.

11. A data storage system comprising:
 a cache memory,
 a storage array, and
 a data processor coupled to the cache memory and coupled to the storage array for modifying pages of data in the cache memory so that a number of the pages in the cache memory become dirty, and writing the dirty pages from the cache memory to the storage array so that the dirty pages become clean, and
 a non-transitory computer readable storage medium storing computer instructions that, when executed by the data processor, perform the steps of:
 (a) obtaining a count of the number of dirty pages in the cache memory; and
 (b) based on the count of the number of dirty pages in the cache memory obtained in step (a), writing the dirty pages from the cache memory to the storage array at a rate having a component proportional to a rate of change in the number of dirty pages in the cache memory;

wherein step (b) includes computing the rate of change in the number of dirty pages in the cache memory over a first interval of time, and the method further includes determining whether the change in the number of dirty pages over the first interval of time plus the count of the number of dirty pages in the cache memory obtained in step (a) exceeds a threshold, and upon determining that the change in the number of dirty pages over the first interval of time plus the count of the number of dirty pages in the cache memory obtained in step (a) exceeds a threshold, computing a number of dirty pages to be written from the cache memory to the storage array over a second interval of time less than the first interval of time, and writing, from the cache memory to the storage array over the second interval of time, the computed number of the dirty pages to be written from the cache memory to the storage array over the second interval of time.

12. The data storage system as claimed in claim 11, wherein step (b) computes the number of dirty pages to be written from the cache memory to the storage array over the second interval of time so that an expected number of dirty pages in the cache memory at the end of the second interval of time is less than the threshold by certain amount.

13. A non-transitory computer readable storage medium storing computer instructions that, when executed by a data processor, perform writeback to a storage array of a number of dirty pages of data in a cache memory by the steps of:
   (a) obtaining a count of the number of dirty pages in the cache memory; and
   (b) based on the count of the number of dirty pages in the cache memory obtained in step (a), writing the dirty pages from the cache memory to the storage array at a rate having a component proportional to a rate of change in the number of dirty pages in the cache memory;
   wherein step (b) includes:
   computing a first term proportional to the rate of change in the dirty pages in the cache memory, and adding the first term to a second term to compute a desired rate for writing the dirty pages are written from the cache memory to the storage array; and writing the dirty pages from the cache memory to the storage array at the desired rate.

14. The non-transitory computer readable storage medium as claimed in claim 13, which includes computing the second term proportional to the count of the number of dirty pages in the cache memory obtained in step (a).

15. The non-transitory computer readable storage medium as claimed in claim 14, which includes computing a difference between a maximum bandwidth of the storage array and the rate of change in the number of dirty pages in the cache memory, and computing the second term proportional to the computed difference between the maximum bandwidth of the storage array and the rate of change in the number of dirty pages in the cache memory.

16. The non-transitory computer readable storage medium as claimed in claim 13, wherein step (b) includes computing a change in the number of dirty pages in the cache memory over an interval of time, and computing a number of the dirty pages to be written from the cache memory to the storage array over the interval of time from the computed change in the number of dirty pages in the cache memory over the interval of time, and writing, from the cache memory to the storage array, the computed number of the dirty pages to be written from the cache memory to the storage array over the interval of time.

17. The non-transitory computer readable storage medium as claimed in claim 13, wherein step (b) includes computing the rate of change in the number of dirty pages in the cache memory over a first interval of time, and the method further includes determining whether the change in the number of dirty pages over the first interval of time plus the count of the number of dirty pages in the cache memory obtained in step (a) exceeds a threshold, and upon determining that the change in the number of dirty pages over the first interval of time plus the count of the number of dirty pages in the cache memory obtained in step (a) exceeds a threshold, computing a number of dirty pages to be written from the cache memory to the storage array over a second interval of time less than the first interval of time, and writing, from the cache memory to the storage array over the second interval of time, the computed number of the dirty pages to be written from the cache memory to the storage array over the second interval of time.

\* \* \* \* \*